(12) United States Patent
Vogel

(10) Patent No.: US 6,985,437 B1
(45) Date of Patent: Jan. 10, 2006

(54) METHOD FOR DYNAMIC PERFORMANCE OPTIMIZATION IN A DATA-OVER-CABLE SYSTEM

(75) Inventor: Mark O. Vogel, Hampshire, IL (US)

(73) Assignee: 3Com Corporation, Marlborough, MA (US)

( * ) Notice: Subject to any disclaimer, the term of this patent is extended or adjusted under 35 U.S.C. 154(b) by 0 days.

(21) Appl. No.: 09/318,460

(22) Filed: May 25, 1999

(51) Int. Cl.
*H04J 1/16* (2006.01)

(52) U.S. Cl. ............... 370/230; 370/235; 370/252; 370/352; 455/3.06; 725/111; 725/125

(58) Field of Classification Search ........ 370/230–235, 370/252, 352–356, 360, 468, 431–442; 455/3.06; 725/111, 125, 107, 124; 348/12
See application file for complete search history.

(56) References Cited

U.S. PATENT DOCUMENTS

| | | | |
|---|---|---|---|
| 4,256,925 A | 3/1981 | Goode | |
| 4,644,533 A | 2/1987 | Braff et al. | 370/94 |
| 4,881,263 A | 11/1989 | Herbison et al. | |
| 4,996,685 A | 2/1991 | Farese et al. | 370/58.1 |
| 5,014,234 A | 5/1991 | Edwards, Jr. | |
| 5,138,712 A | 8/1992 | Corbin | |
| 5,301,273 A | 4/1994 | Konishi | 395/200 |
| 5,347,304 A | 9/1994 | Moura | |
| 5,363,374 A | 11/1994 | Zein Al Abedeen et al. | |
| 5,400,322 A * | 3/1995 | Hunt et al. | 370/468 |
| 5,430,727 A | 7/1995 | Callon | 370/85.13 |
| 5,442,749 A | 8/1995 | Northcutt et al. | |
| 5,446,739 A | 8/1995 | Nakano | |
| 5,488,412 A | 1/1996 | Majeti | |
| 5,489,897 A | 2/1996 | Inoue | |
| 5,528,595 A | 6/1996 | Walsh et al. | 370/85.13 |
| 5,583,931 A | 12/1996 | Schneider | |
| 5,586,121 A | 12/1996 | Moura | |
| 5,598,410 A | 1/1997 | Stone | |
| 5,600,717 A | 2/1997 | Schneider | |
| 5,606,606 A | 2/1997 | Schneider | |
| 5,608,446 A | 3/1997 | Carr | |
| 5,610,910 A | 3/1997 | Focsaneanu et al. | 370/351 |
| 5,623,542 A | 4/1997 | Schneider | |
| 5,623,601 A | 4/1997 | Vu | |

(Continued)

FOREIGN PATENT DOCUMENTS

EP    0 713 347 A2    11/1995

(Continued)

OTHER PUBLICATIONS

"Baseline Privacy Interface Specification (Interim) SP-BPI-I01-970922", MCNS Holdings, L.P., 1997, pp. ii to 65.

(Continued)

*Primary Examiner*—Frank Duong
*Assistant Examiner*—Melanie Jagannathan
(74) *Attorney, Agent, or Firm*—McDonnell Boehnen Hulbert & Berghoff LLP

(57) ABSTRACT

A method and system for optimizing performance in a data-over-cable system. The method includes determining parameters for data transmission on an upstream channel of the data-over-cable system, and negotiating use of the parameters. A measurement is made of a signal-to-noise ratio ("SNR") on the upstream channel. Associated with the SNR and a target packet-error-ratio ("PER") are parameters that provide optimal data throughput. The parameters, such as symbol rate, type of modulation, or amount of error correction, are used to construct a message that is sent to the cable modems. The message instructs the cable modems to reconfigure themselves to transmit according to the parameters. The reconfiguration helps ensure optimal performance.

31 Claims, 15 Drawing Sheets

U.S. PATENT DOCUMENTS

| | | | |
|---|---|---|---|
| 5,636,211 A | 6/1997 | Newlin | |
| 5,675,732 A | 10/1997 | Majeti | |
| 5,675,742 A | 10/1997 | Jain et al. | 395/200 |
| 5,678,041 A | 10/1997 | Baker et al. | 395/609 |
| 5,708,654 A | 1/1998 | Arndt et al. | 370/242 |
| 5,710,885 A | 1/1998 | Bondi | |
| 5,724,510 A | 3/1998 | Arndt et al. | 395/200.5 |
| 5,761,602 A | 6/1998 | Wagner et al. | |
| 5,778,181 A | 7/1998 | Hidary et al. | |
| 5,784,597 A | 7/1998 | Chiu et al. | 395/552 |
| 5,790,198 A | 8/1998 | Roop et al. | |
| 5,790,548 A | 8/1998 | Sistanizadeh et al. | |
| 5,790,677 A | 8/1998 | Fox et al. | |
| 5,790,770 A | 8/1998 | McClure et al. | 395/200.61 |
| 5,790,806 A | 8/1998 | Koperda | |
| 5,793,747 A | 8/1998 | Kline | 370/230 |
| 5,799,086 A | 8/1998 | Sudia | |
| 5,805,804 A | 9/1998 | Laursen et al. | |
| 5,809,252 A | 9/1998 | Beighe et al. | 395/200.57 |
| 5,812,819 A | 9/1998 | Rodwin et al. | |
| 5,815,664 A | 9/1998 | Asano | 395/200.57 |
| 5,818,845 A | 10/1998 | Moura et al. | |
| 5,819,028 A | 10/1998 | Manghirmalani et al. | |
| 5,819,042 A | 10/1998 | Hansen | |
| 5,828,655 A | 10/1998 | Moura et al. | |
| 5,828,666 A | 10/1998 | Focsaneanu et al. | 370/389 |
| 5,835,720 A | 11/1998 | Nelson et al. | |
| 5,835,727 A | 11/1998 | Wong et al. | |
| 5,841,777 A | 11/1998 | Cohen | |
| 5,848,233 A | 12/1998 | Radia et al. | 395/187.01 |
| 5,852,721 A | 12/1998 | Dillon et al. | |
| 5,859,852 A | 1/1999 | Moura et al. | |
| 5,864,679 A | 1/1999 | Kanai et al. | |
| 5,870,134 A | 2/1999 | Laubach et al. | |
| 5,872,523 A | 2/1999 | Dellaverson et al. | |
| 5,881,362 A * | 3/1999 | Eldering et al. | 725/125 |
| 5,884,024 A | 3/1999 | Lim et al. | |
| 5,892,754 A | 4/1999 | Kompella et al. | 370/236 |
| 5,894,479 A | 4/1999 | Mohammed | 370/401 |
| 5,903,558 A | 5/1999 | Jones et al. | |
| 5,909,549 A | 6/1999 | Compliment et al. | 709/223 |
| 5,913,037 A | 6/1999 | Spofford et al. | |
| 5,915,119 A | 6/1999 | Cone | 395/750.02 |
| 5,922,049 A | 7/1999 | Radia et al. | |
| 5,922,051 A | 7/1999 | Sidey | |
| 5,923,659 A | 7/1999 | Curry et al. | |
| 5,926,458 A | 7/1999 | Yin | 370/230 |
| 5,929,850 A | 7/1999 | Broadwin et al. | 345/327 |
| 5,941,988 A | 8/1999 | Bhagwat et al. | 713/201 |
| 5,943,604 A * | 8/1999 | Chen et al. | 455/3.06 |
| 5,954,797 A | 9/1999 | Sidey | |
| 5,958,007 A | 9/1999 | Lee et al. | |
| 5,960,177 A | 9/1999 | Tanno | 395/200.59 |
| 5,974,453 A | 10/1999 | Andersen et al. | |
| 5,982,748 A | 11/1999 | Yin et al. | 370/232 |
| 5,987,524 A | 11/1999 | Yoshida et al. | 709/245 |
| 5,991,292 A | 11/1999 | Focsaneanu et al. | 370/352 |
| 5,991,306 A | 11/1999 | Burns et al. | 370/429 |
| 5,996,076 A | 11/1999 | Rowney et al. | |
| 5,999,536 A | 12/1999 | Kawafuji et al. | 370/401 |
| 6,003,077 A | 12/1999 | Bawden et al. | |
| 6,005,851 A | 12/1999 | Craddock et al. | 370/329 |
| 6,006,264 A | 12/1999 | Colby et al. | |
| 6,009,103 A | 12/1999 | Woundy | |
| 6,012,088 A | 1/2000 | Li et al. | |
| 6,013,107 A | 1/2000 | Blackshear et al. | |
| 6,014,545 A | 1/2000 | Wu et al. | 455/3.1 |
| 6,018,767 A | 1/2000 | Fijolek et al. | |
| 6,031,841 A | 2/2000 | Woundy | 370/410 |
| 6,032,019 A | 2/2000 | Chen et al. | 455/5.1 |
| 6,041,041 A | 3/2000 | Ramanathan et al. | 370/241 |
| 6,046,979 A | 4/2000 | Bauman | 370/229 |
| 6,049,546 A | 4/2000 | Ramakrishnan | |
| 6,049,825 A | 4/2000 | Yamamoto | 709/221 |
| 6,049,826 A | 4/2000 | Beser | |
| 6,052,724 A | 4/2000 | Willie et al. | |
| 6,058,421 A | 5/2000 | Fijolek et al. | |
| 6,061,349 A | 5/2000 | Coile et al. | 370/389 |
| 6,064,372 A | 5/2000 | Kahkoska | 345/173 |
| 6,065,049 A | 5/2000 | Beser | 709/218 |
| 6,070,187 A | 5/2000 | Subramaniam et al. | 709/220 |
| 6,070,242 A | 5/2000 | Wong et al. | 713/201 |
| 6,070,246 A | 5/2000 | Beser | |
| 6,073,178 A | 6/2000 | Wong et al. | 709/229 |
| 6,075,787 A | 6/2000 | Bobeck et al. | |
| 6,091,709 A | 7/2000 | Harrison et al. | 370/235 |
| 6,094,431 A | 7/2000 | Yamato et al. | 370/395 |
| 6,104,700 A | 8/2000 | Haddock et al. | 370/235 |
| 6,112,258 A | 8/2000 | Miller et al. | 710/19 |
| 6,122,254 A | 9/2000 | Aydemir et al. | 370/235 |
| 6,128,298 A | 10/2000 | Wootton et al. | 370/392 |
| 6,130,879 A | 10/2000 | Liu | 370/230 |
| 6,130,880 A | 10/2000 | Naudus et al. | 370/235 |
| 6,137,792 A | 10/2000 | Jonas et al. | 370/354 |
| 6,137,793 A * | 10/2000 | Gorman et al. | 370/360 |
| 6,148,410 A | 11/2000 | Baskey et al. | 714/4 |
| 6,157,965 A | 12/2000 | Mohammed et al. | 710/8 |
| 6,170,061 B1 | 1/2001 | Beser | 713/201 |
| 6,178,455 B1 | 1/2001 | Schutte et al. | 709/228 |
| 6,185,624 B1 | 2/2001 | Fijolek et al. | 709/239 |
| 6,189,102 B1 | 2/2001 | Beser | 713/201 |
| 6,212,563 B1 | 4/2001 | Beser | 709/227 |
| 6,216,171 B1 | 4/2001 | Isono et al. | 709/250 |
| 6,223,222 B1 | 4/2001 | Fijolek et al. | 709/227 |
| 6,240,464 B1 | 5/2001 | Fijolek et al. | 709/250 |
| 6,243,369 B1 | 6/2001 | Grimwood et al. | 370/335 |
| 6,260,072 B1 | 7/2001 | Rodriguez-Moral | 709/241 |
| 6,269,099 B1 | 7/2001 | Borella et al. | 370/389 |
| 6,272,150 B1 | 8/2001 | Hrastar | 370/486 |
| 6,275,853 B1 | 8/2001 | Beser et al. | 709/223 |
| 6,289,377 B1 | 9/2001 | Lalwaney et al. | 709/222 |
| 6,295,554 B1 | 9/2001 | Karadogan | 709/219 |
| 6,301,223 B1 | 10/2001 | Hrastar et al. | 370/227 |
| 6,301,618 B1 | 10/2001 | Sitaraman et al. | 709/227 |
| 6,308,328 B1 * | 10/2001 | Bowcutt et al. | 725/111 |
| 6,321,384 B1 * | 11/2001 | Eldering | 725/125 |
| 6,331,987 B1 | 12/2001 | Beser | 370/486 |
| 6,332,163 B1 | 12/2001 | Bowman-Amuah | 709/231 |
| 6,337,858 B1 | 1/2002 | Petty et al. | 370/356 |
| 6,351,773 B1 | 2/2002 | Fijolek et al. | 709/228 |
| 6,370,147 B1 | 4/2002 | Beser | 370/401 |
| 6,385,773 B1 * | 5/2002 | Schwartzman et al. | 725/124 |
| 6,393,478 B1 | 5/2002 | Bahlmann | 709/224 |
| 6,442,158 B1 | 8/2002 | Beser | 370/352 |
| 6,449,291 B1 | 9/2002 | Burns et al. | 370/516 |
| 6,453,472 B1 | 9/2002 | Leano et al. | 725/111 |
| 6,490,727 B1 | 12/2002 | Nazarathy et al. | 725/129 |
| 6,510,162 B1 | 1/2003 | Fijolek et al. | 370/432 |
| 2002/0122050 A1 | 9/2002 | Sandberg | 345/705 |
| 2002/0136165 A1 | 9/2002 | Ady et al. | 370/241 |
| 2003/0028891 A1 | 2/2003 | Hardt et al. | 725/107 |

FOREIGN PATENT DOCUMENTS

| | | |
|---|---|---|
| GB | 2 232 326 A | 5/1989 |
| GB | 2 263 847 A | 7/1992 |
| GB | 2 270 815 A | 9/1992 |
| GB | 2 275 588 A | 2/1994 |
| GB | 2 298 999 A | 7/1995 |
| GB | 2 303 764 A | 7/1995 |
| GB | 2 302 485 A | 6/1996 |
| JP | 08008784 A | 1/1996 |

| | | |
|---|---|---|
| WO | WO 91/08629 | 11/1990 |
| WO | WO 96 08934 | 3/1996 |
| WO | WO 00/67385 | 11/2000 |

OTHER PUBLICATIONS

"Security System Specification (Interim Specification) SP-SSI-I01-970506", MCNS Holdings, L.P., 1997, pp. ii to 103.

"Cable Modem to Customer Premise Equipment Interface Specification (Interim) SP-CMCI-I02-980317", Multimedia Cable Network Systems (MCNS) Holdings, L.P., Cable Television Laboratories, Inc., 1998, pp. ii to 40.

"Operations Support System Interface Specification Baseline Privacy Interface MIB (Interim Specification) SP-OSSI-BPI-I01-980331", MCNS Holdings, L.P., 1997 and 1998, pp. ii to 33.

"Cable Modem Termination System-Network Side Interface Specification (Interim Specification) SP-CMTS-NSII01-960702", MCNS Holdings, L.P., 1996, pp. ii to 13.

"Removable Security Module Interface Specification (Interim Specification) SP-RSMI-I01-980204", MCNS Holdings, L.P., Cable Television Laboratories, Inc., 1997, pp. ii to 47.

"Operations Support System Interface Specification (Interim) SP-OSSII01-970403", MCNS Holdings, L.P., 1997, pp. 1 to 30.

"Radio Frequency Interface Specification (Interim Specification) SP-RFI-I02-971008", MCNS Holdings, L.P., 1997, pp. ii to 186.

"Cable Modem Telephony Return Interface Specification (Interim) SP-CMTRI-I01-970804", MCNS Holdings, L.P., Cable Television Laboratories, Inc., 1997, pp. ii to 73.

"Internet Engineering Task Force", Request for Comments 2131, Dynamic Host Configuration Protocol (DHCP), Mar. 1997, pp. 1 to 42.

"Internet Engineering Task Force", IPCDN Working Group, IPCDN Telephony Return MIB, Mar. 1998, pp. 1 to 27.

Basu et al., Multi-rate Services: Challenges in Network Design, pp. 644-649, 1994.

Fred J. Kaudel et al., "Performance of an Efficient Discipline for Hybrid STM-ATM Switching and Transport", pp. 1099-1108, 1994.

Brochure: Ride The Way With COMSAT LABS ATM Products.

Two (2) Search Reports.

Kyees et al., IEEE Electronic Library, Citation and Abstract, IEEE Communications Magazine, vol. 33, Issue 4, Apr. 1995, "ADSL: A New Twisted-Pair Access To The Information Highway," pp. 52-60.

Yin-Hwa Huang et al., IEEE Electronic Library, Citation and Abstract, Acoustics, Speech, and Signal Processing, 1995. ICASSP-95., 1995 International Conference, vol. 4, May 9-12, 1995, "Design Of An MPEG-Based Set-Top Box For Video On Demand Services," pp. 2655-2658.

"Radio Frequency Interface Specification (Interim Specification) SP-RFI-I04-980724", MCNS Holdings, L.P., 1997, pp. ii to 196.

"Radio Frequency Interface Specification (Interim Specification) SP-RFI-I05-991105", MCNS Holdings, L.P., 1999, pp. ii to 202.

"Radio Frequency Interface Specification (Interim Specification) SP-RFIv1.1-106-001215", MCNS Holdings, L.P., 2000, pp. ii to 432.

Droms, R., *Dynamic Host Configuration Protocol*, Request for Comments 1541, Oct. 1993, pp. 1 to 31.

RFC 791, *Internet Protocol, DARPA Internet Program Protocol Specification*, Sep. 1981, pp. 1-37.

Postel, J., *Internet Protocol, DARPA Internet Program Protocol Specification*, RFC 792, Sep. 1981, pp. 1-14.

Postel, J., *User Datagram Protocol*, RFC 768, Aug. 28, 1980, pp. 1-3.

RFC 793, *Transmission Control Protocol, DARPA Internet Program Protocol Specification*, Sep. 1981, pp. 1-68.

Case, J. et al., *A Simple Network Management Protocol (SNMP)*, RFC 1157, May 1990, pp. 1-26.

Sollins, K., *The TFTP Protocol (Revision 2)*, RFC 1350, Jul. 1992, pp. 1-9.

Alexander, S., *DHCP Options and BOOTP Vendor Extensions*, RFC 2132, Mar. 1997, pp. 1-37.

"Radio Frequency Interface Specification (Interim Specification) SP-RFIv1.1-I03-991105", MCNS Holdings, L.P., 1999, pp. Ii to 366.

* cited by examiner

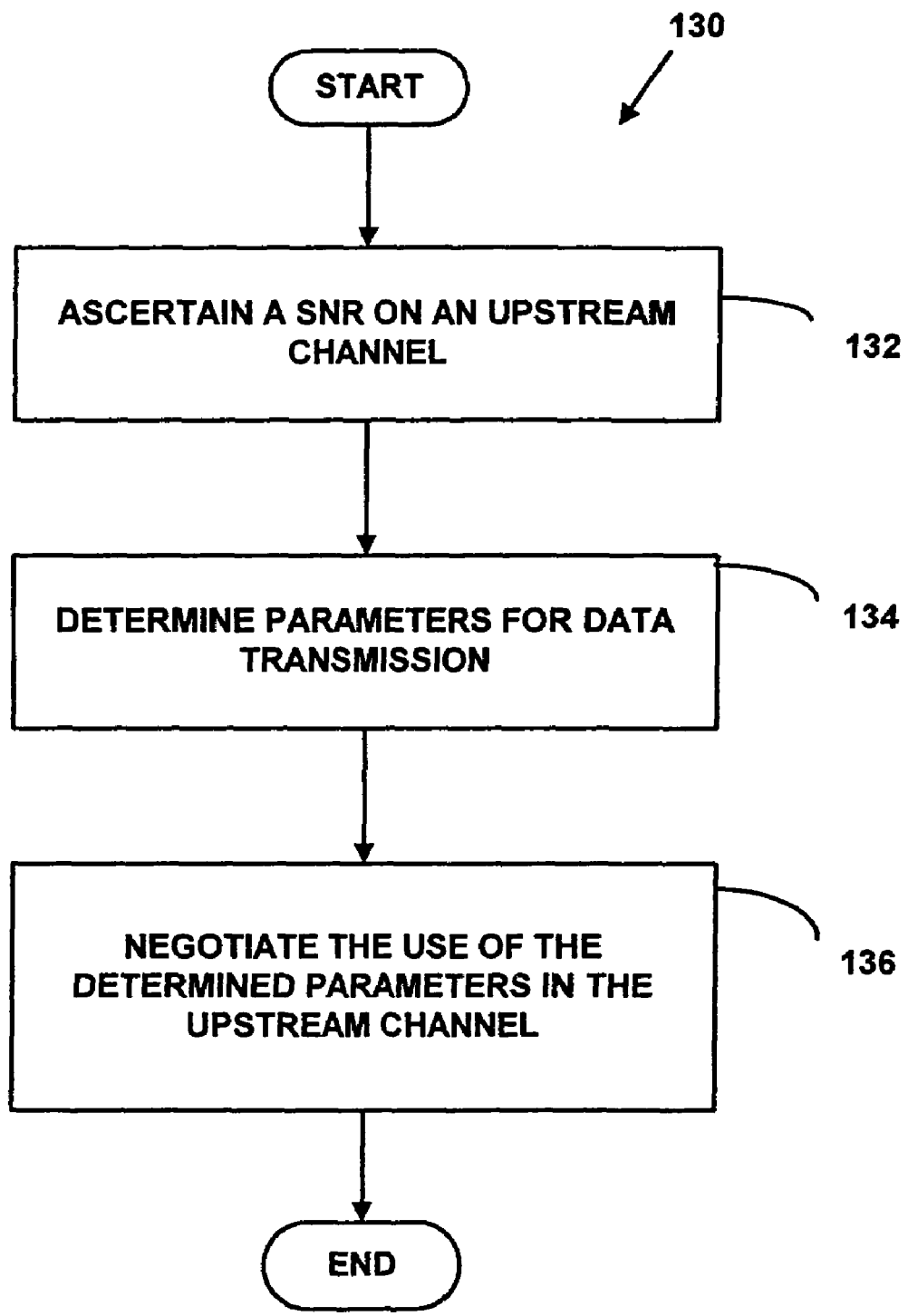

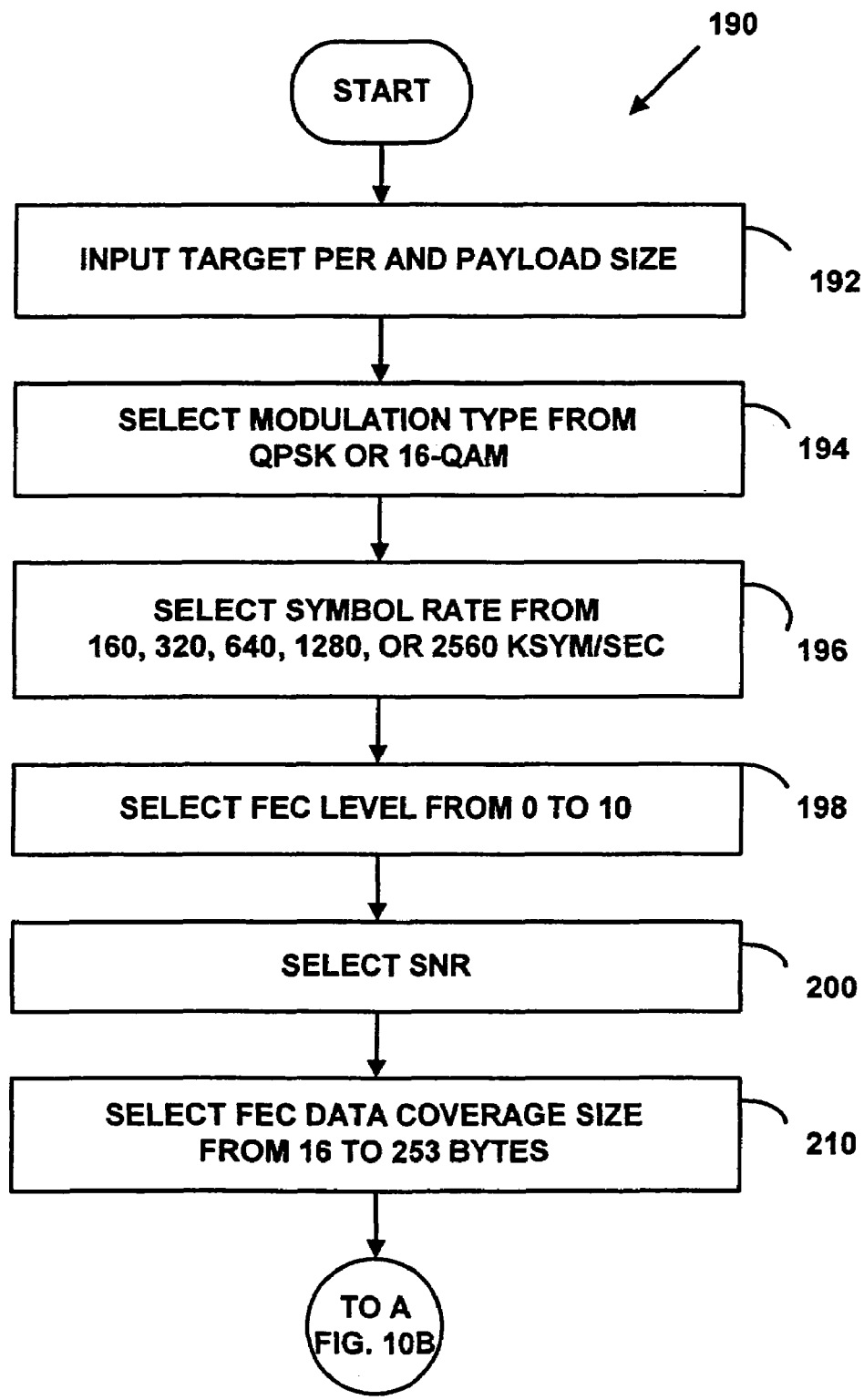

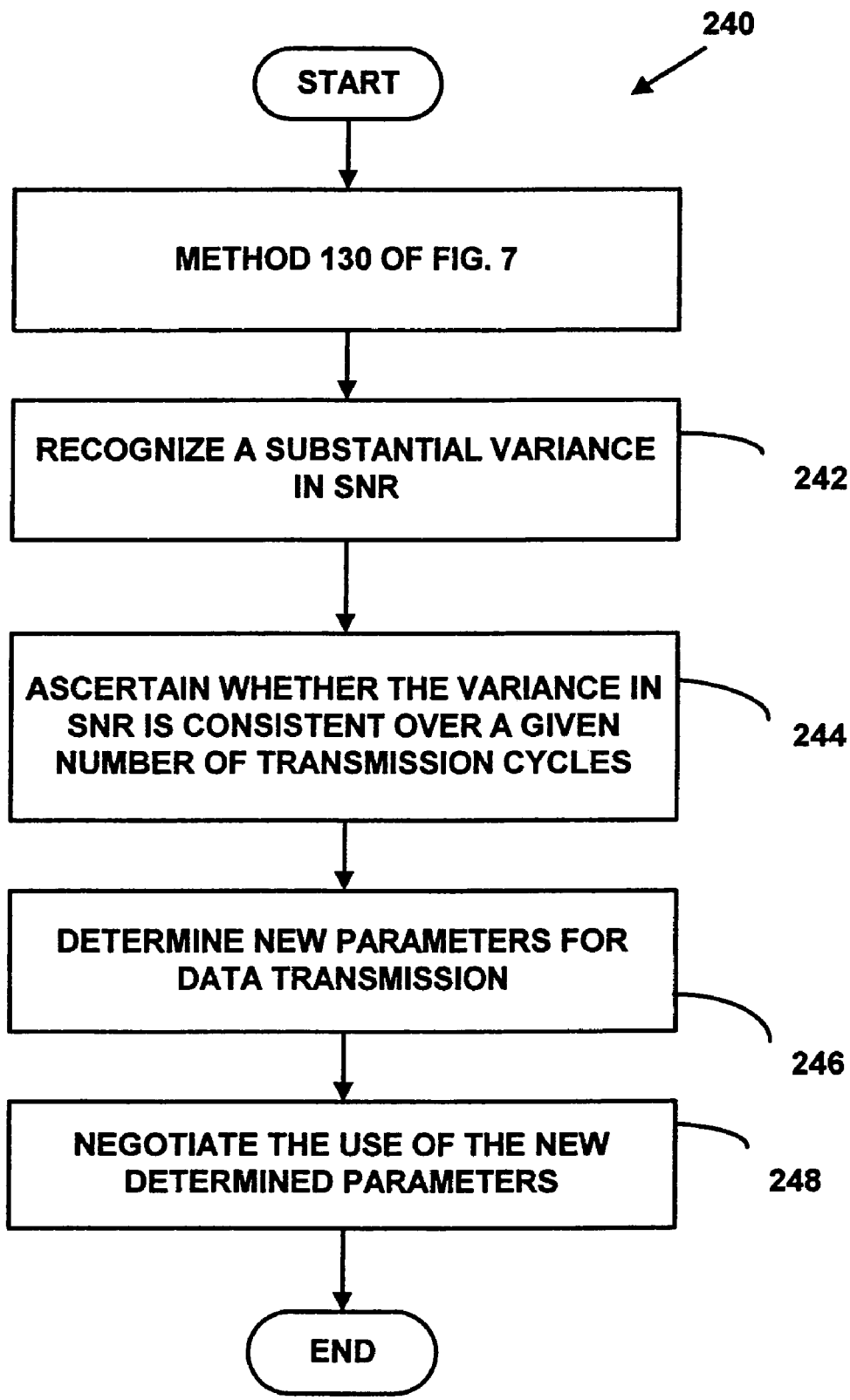

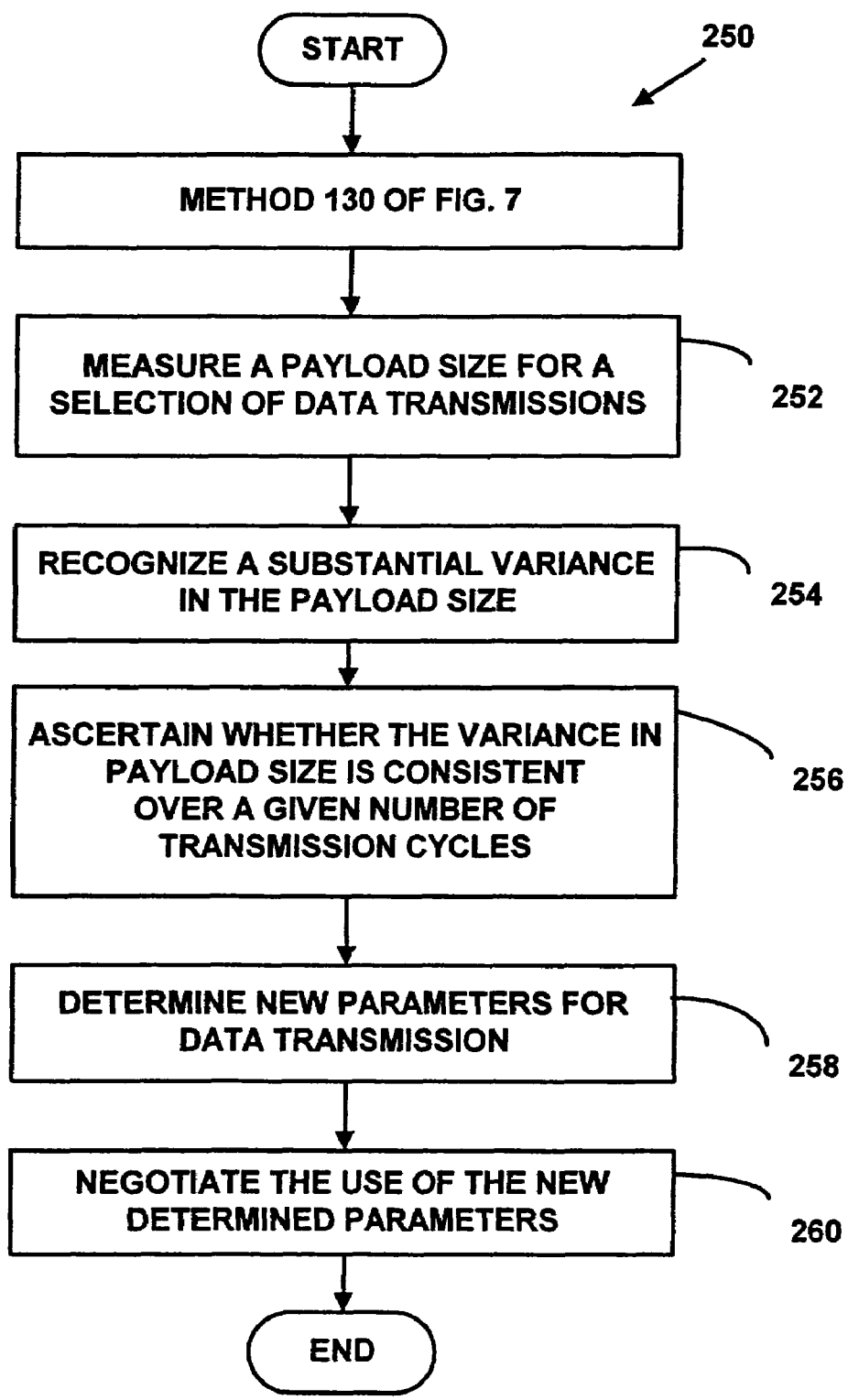

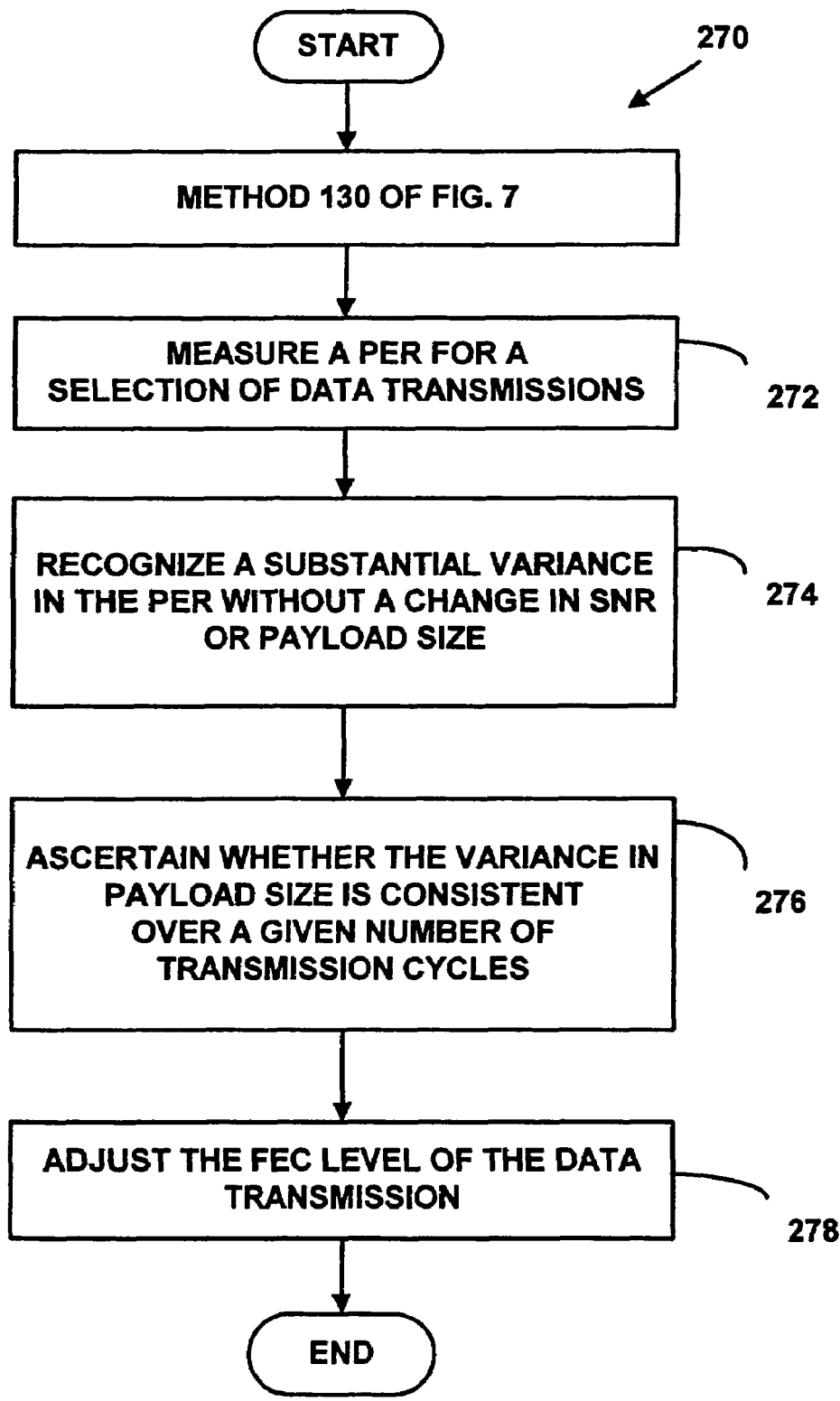

METHOD FOR DYNAMIC PERFORMANCE OPTIMIZATION IN A DATA-OVER-CABLE SYSTEM

FIELD OF INVENTION

The present invention relates to communications in computer networks. More specifically, it relates to a method for dynamically optimizing performance in a data-over-cable system.

BACKGROUND OF THE INVENTION

Cable television networks such as those provided by Comcast Cable Communications, Inc., of Philadelphia, Pa., Cox Communications of Atlanta Ga., Tele-Communications, Inc., of Englewood Colo., Time-Warner Cable, of Marietta Ga., Continental Cablevision, Inc., of Boston Mass., and others provide cable television service to a large number of subscribers over a large geographical area. The cable television networks typically are interconnected by cables such as coaxial cables or a Hybrid Fiber/Coaxial ("HFC") cable system. The system can also provide data services having data rates of about 10 Mega-bits-per-second ("Mbps") to 30+ Mbps per channel.

The Internet, a world-wide-network of interconnected computers, provides multi-media content including audio, video, graphics and text that requires a large bandwidth for downloading and viewing. Most Internet Service Providers ("ISPs") allow customers to connect to the Internet via a serial telephone line from a public switched telephone network at data rates including 14,400 bps, 28,800 bps, 33,600 bps, 56,000 bps and others that are much slower than the about 10 Mbps to 30+ Mbps available on a coaxial cable or HFC cable system on a cable television network.

With the explosive growth of the Internet, many customers have desired to use the larger bandwidth of a cable television network to connect to the Internet and other computer networks. Cable modems, such as those provided by 3Com Corporation of Santa Clara, Calif., and others offer customers higher-speed connectivity to the Internet, an intranet, local area networks ("LANs") and other computer networks via cable television networks. These cable modems currently support a data connection to the Internet and other computer networks via a cable television network with a data rate of up to 30+ Mbps which is a much larger data rate than can be supported by a modem used over a serial telephone line.

Background information related to cable modem systems in general is described in the Data-Over-Cable Service Interface Specifications ("DOCSIS")—Radio Frequency Interface Specifications, Interim Draft, dated Jul. 24, 1998, issued by Cable Television Laboratories, Inc. DOCSIS may be found on the World Wide Web at the Universal Resource Locator ("URL") "www.cablemodem.com". This document, known to persons working in the art, is incorporated by reference herein in its entirety.

The basic overall architecture of a data-over-cable system is shown in FIG. 1. The system of FIG. 1 provides a mechanism by which a computer 10 connected to a backbone network 12 (either directly or indirectly by intermediate networks) may communicate with another computer 14 via a cable television infrastructure indicated generally by reference numeral 16. The cable television infrastructure 16 includes a distribution hub or "head-end" 18 that is connected to the backbone network 12 via a wide area network ("WAN") and a switch or router 20. A cable system head-end 18 is a central location in the cable television network that is responsible for sending cable signals in the downstream direction. The head-end 18 modulates digital data into analog form and supplies analog signals to a fiber network 22, which is connected to a plurality of optical/electronic ("O/E") nodes 24. The O/E nodes 24 convert optical signals in the fiber network 22 to electrical signals for transmission over a coax cable network 26 to a cable modem 28 at the customer's location. The cable modem 28 demodulates the analog signals and extracts the digital data and supplies the data to the customer premise equipment ("CPE") 14, which, in a typical situation, is a general purpose computer in a home environment.

The head-end 18 includes a cable modem termination system ("CMTS") 30. This device provides a network side interface to a wide area network, indicated at 32, and a radio frequency ("RF") interface between the cable modem termination system and the cable network in both the downstream and upstream directions, indicated at 34 and 36. The term "downstream", as used in the present document, refers to transmission in the direction from the head-end 18 or cable modem termination system 30 to the cable modem 28 at the customer premises. The term "upstream" refers to transmission in the direction from the cable modem 28 at the customer premises to the cable modem termination system 30.

For transmission in the downstream direction, the cable modem termination system 30 supplies data from the computer 10 to a modulation circuit ("MOD") and to a combiner 38, where the data is combined with video signals for the cable television system. The combined signals are sent to a transmission module 40 where they are imparted onto the fiber network. In the receiving direction, data from the CPE 14 is received from the fiber network at a receive module 42, sent to a splitter and filter bank 44 and sent to a demodulation circuit ("DEMOD") in the cable modem termination system 30. The data is processed by a network termination unit 46, sent to the switch or router 20 and routed onto the WAN for transmission to the remote computer 10.

Many cable television networks provide only unidirectional cable systems, supporting only a "downstream" cable data path. A return data path via a telephone network (i.e., a "telephony return"), such as a public switched telephone network provided by AT&T, GTE, Sprint, MCI and others, is typically used for an "upstream" data path. A cable television system with an upstream connection to a telephony network is called a "data-over-cable system with telephony return." Such a return system is indicated at 48 where the cable modem 28 is also shown connected to the public switched telephone network ("PSTN").

An exemplary data-over-cable system with telephony return includes customer premises equipment (e.g., a customer computer), a cable modem, a cable modem termination system, a cable television network, a public switched telephone network, a telephony remote access concentrator ("TRAC") 49 and a backbone data network 12 (e.g., the Internet). The cable modem termination system 30 and the telephony remote access concentrator 49 together are called a "telephony return termination system."

In a two-way cable system without telephony return, also termed a bi-directional cable system, the customer premises equipment 14 sends data packets to the cable modem 28, which sends the data packets upstream via the cable television network 22 and 26 to the cable modem termination system 30. Such a system is shown in FIG. 1. The cable modem termination system 30 sends the data packets to appropriate hosts on the data network 12. The cable modem termination system 30 sends the response data packets back to the appropriate cable modem 28.

In a bi-directional cable system, the cable modem termination system 30 can continuously collect information about the level of impairments on the upstream RF path of a cable plant, i.e., the portion of the network between the demodulation circuit in the cable modem termination system 30 and the cable modems 28. Further, a single O/E node 24 may serve multiple channels and cable modems. Measurements such as the noise floor level, and signal-to-noise ratio per cable modem transmission, can be made for the coax and fiber networks, along with the tracking of which cable modems are active during a given measurement interval.

The data-carrying performance of the upstream channels may vary with the conditions for radio frequency propagation on the cable network. Defective radio frequency interfaces may introduce sufficient noise into an upstream channel that the noise significantly impairs the ability of the channel to transport data packets from the cable modems to the cable modem termination system without error. Extraneous sources of radio frequency, such as citizen band or amateur radio broadcasts, may also infiltrate the upstream channels, interfere with the radio frequency carriers for the upstream channels, increase the packet error rate, reduce the data throughput, and generally impair the performance of the data-over-cable network.

Previous methods for improving performance have included switching the frequency of a degraded upstream channel to another part of the upstream radio frequency spectrum on the cable. The cable modems on the degraded upstream channel are all instructed to hop to a clean frequency. However, the methods are ineffective when the degradation is present over the full spectrum of upstream frequencies, as there are no cleaner frequencies than the current operating frequency.

Previous methods also typically retain the same data transmission configurations for the cable modems when there are other configurations of the cable modems that may optimize throughput for the current network conditions. In many instances, static configurations for the cable modems may actually limit throughput relative to what could be achieved. In previous methods, the configurations of the cable modems are determined at the time the cable modems initialize or the configurations are preset at the factory. The configuration parameters include the type of radio frequency modulation, the type and extent of error correction, and the symbol rate. In particular, static configurations cannot compensate for an intermittent degradation or a reconfiguration of the network and network paths. As the degradation impinges on the network, the current configurations of the cable modems may be different from those that give the optimal throughput of data. Dynamic configuration of the cable modems may allow the network to attain its optimal performance.

It is therefore desirable to improve the configuration of the cable modems so that upstream performance is optimized for the present network conditions. Optimizing data throughput may improve the performance of the data-over-cable network.

SUMMARY OF THE INVENTION

In accordance with an exemplary preferred embodiment of the present invention, some of the problems associated with optimizing performance are overcome. A method and system for optimizing performance in a data-over-cable system is provided. One aspect of the invention includes a method for optimizing data throughput on an upstream channel at a target packet error ratio. The method includes ascertaining a signal-to-noise ratio on the upstream channel. Parameters for data transmissions by the cable modems on the upstream channel are determined. The determined parameters are associated with the signal-to-noise ratio and the target packet error ratio. The use of the determined parameters in the upstream channel is negotiated.

For example, the method and system of the present invention may provide for optimizing data throughput on an upstream channel at a target packet error ratio. A cable modem termination system may schedule a plurality of quiescent periods on the upstream channel. A quiescent period is when no data is transmitted by the cable modems on the upstream channel. A noise floor value is measured on the upstream channel during at least one of the quiescent periods and converted to a signal-to-noise ratio. Parameters for data transmission on the upstream channel are read from a table. The parameters in the table are associated with the signal-to-noise ratio and the target packet error ratio. An Upstream Channel Descriptor message, based on the parameters, is built and sent to the cable modems. However, the present invention is not limited to cable modems, cable modem termination systems, Upstream Channel Descriptor messages, or tables, and other network devices and parameters could be used.

The foregoing and other features and advantages of preferred embodiments of the present invention will be more readily apparent from the following detailed description, which proceeds with references to the accompanying drawings.

BRIEF DESCRIPTION OF THE DRAWINGS

Preferred embodiments of the present invention are described with reference to the following drawings, wherein:

FIG. 7 is a flow diagram illustrating a method for optimizing data throughput on an upstream channel;

FIG. 11 is a flow diagram illustrating a method for optimizing data throughput on an upstream channel;

FIG. 12 is a flow diagram illustrating a method for optimizing data throughput on an upstream channel; and FIG. 13 is a flow diagram illustrating a method for optimizing data throughput on an upstream channel.

DETAILED DESCRIPTION OF PREFERRED EMBODIMENTS

In a bi-directional data-over-cable system, a cable modem ("CM") 28 will transmit data packets to the cable modem termination system ("CMTS) 30 over one or more upstream channels on the cable television network 22 and 26. A data packet may carry, as its payload, information that is sent from the customer premise equipment ("CPE") 14 and destined for the CMTS 30. The CM 28 adds overhead to the data packet to maintain the integrity of the payload. Examples of overhead include redundant bits for error correction and preambles. The data packet and overhead are transmitted from and received by the CM 28 in the form of digitally modulated radio frequency carriers on the analog cable network.

Cable Modem Protocol Stack

Figure 1:
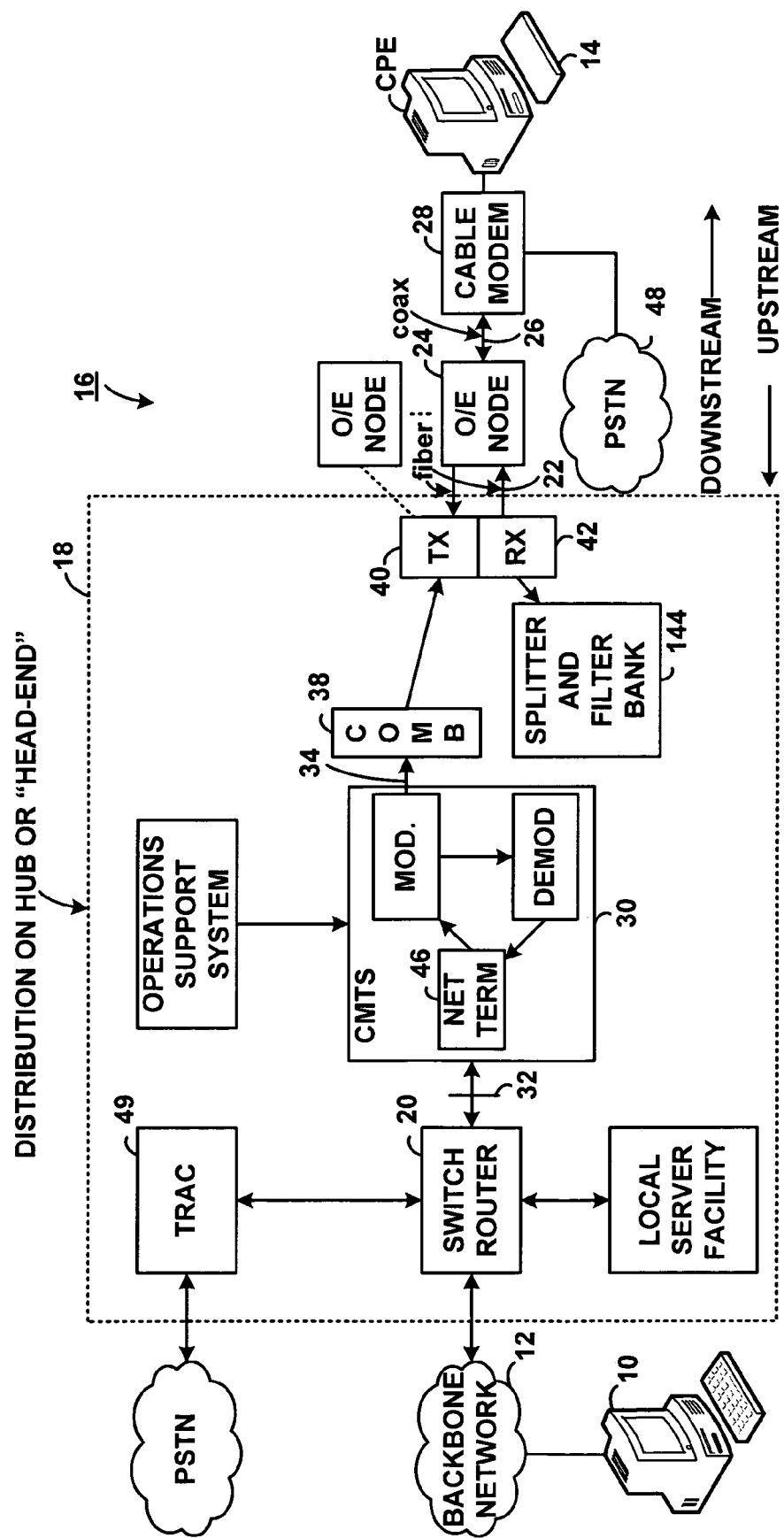
FIG. 1 is a block diagram illustrating a cable modem system.
Figure 2:
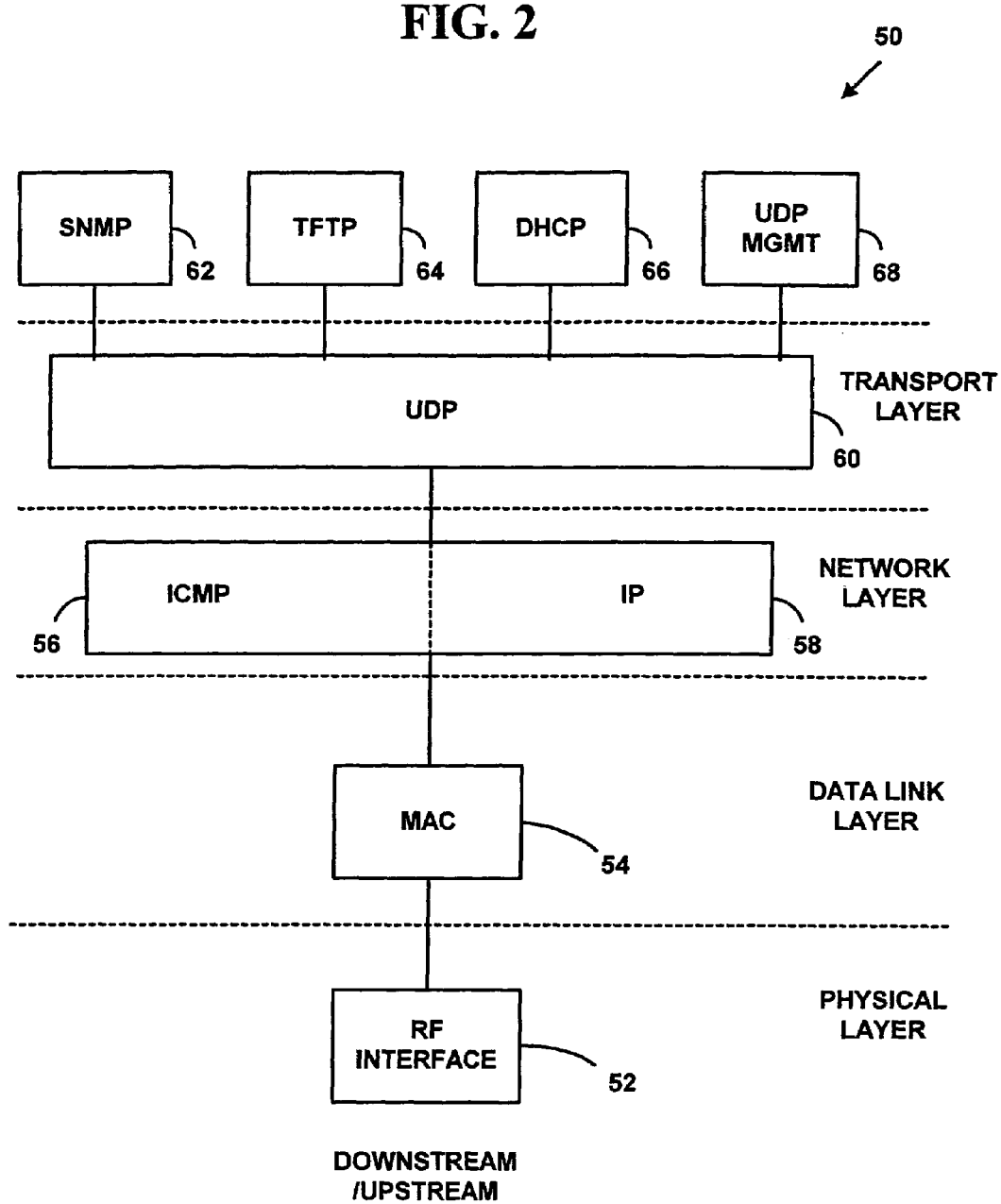
FIG. 2 is a block diagram illustrating a protocol stack for a cable modem.

FIG. 2 is a block diagram illustrating a protocol stack 50 for the CM 28. FIG. 2 illustrates the downstream and upstream protocols used in the CM 28. As is known in the art, the Open System Interconnection ("OSI") model is used to describe computer networks. The OSI model consists of seven layers including from lowest-to-highest, a physical, data-link, network, transport, session, application and presentation layer. The network layer places routing information into the data packets. The data link layer transmits data packets. The physical layer transmits the data packets and overhead as bits over a communication link.

For data transmission over a bi-directional data-over-cable system, the CM 28 is connected to the cable network 26 in a physical layer via a Radio Frequency ("RF") Interface 52. In an exemplary preferred embodiment of the present invention, the RF Interface 52 has an operation frequency range of 50 Mega-Hertz ("MHz") to 1 Giga-Hertz ("GHz") and a channel bandwidth of 6 MHz on the downstream channels. In another exemplary preferred embodiment of the present invention, the RF Interface 52 has an operation frequency range of 5 MHz to 42 MHz on the upstream channels. However, other operation frequencies and bandwidths may also be used and the invention is not limited to these frequencies and bandwidths. The RF interface 52 uses a signal modulation method of Quadrature Amplitude Modulation ("QAM"). As is known in the art, QAM is used as a means of encoding digital information over radio, wire, or fiber optic transmission links. QAM is a combination of amplitude and phase modulation and is an extension of multiphase phase-shift-keying. QAM can have any number of discrete digital levels typically including 4, 16, 64 or 256 levels. In one embodiment of the present invention, QAM-64 is used in the RF interface 52 for downstream transmission. In another embodiment of the present invention, QAM-16 or Quadrature Phase-Shift-Keying ("QPSK") is used for upstream transmission. In this embodiment, the symbol rate of upstream transmission may be 160, 320, 640, 1,280, or 2,560 kilo-symbols per second ("ksym/sec") for 16-QAM, or 160, 320, 640, 1,280, or 2,560 ksym/sec for QPSK. However, other operating frequencies, modulation methods, and symbol rates could also be used. More information may be found in DOCSIS. Other information on the RF interface 52 can be found in the Institute of Electrical and Electronic Engineers ("IEEE") standard 802.14 for cable modems incorporated herein by reference. IEEE standards can be found on the World Wide Web at the Universal Resource Locator ("URL") "www.ieee.org." However, other RF interfaces 52 could also be used and the present invention is not limited to IEEE 802.14.

Above the RF interface 52 in a data-link layer is a Medium Access Control ("MAC") layer 54. As is known in the art, the MAC layer 54 controls access to a transmission medium via the physical layer. Information on the MAC layer protocol 54 may be found in DOCSIS. Other information can be found in the IEEE 802.14 for cable modems. However, other MAC layer protocols 54 could also be used and the present invention is not limited to IEEE 802.14 MAC layer protocols.

Above both the downstream and upstream protocol layers in a network layer 52 is an Internet Protocol ("IP") layer 58. The IP layer 58, hereinafter IP 58, roughly corresponds to OSI layer 3, the network layer, but is typically not defined as part of the OSI model. As is known in the art, the IP 58 is a routing protocol designed to route traffic within a network or between networks. For more information on the IP 58 see RFC-791 incorporated herein by reference.

The Internet Control Message Protocol ("ICMP") layer 56 is used for network management. The main functions of the ICMP layer 56, hereinafter ICMP 56, include error reporting, reachability testing (e.g., "pinging") congestion control, route-change notification, performance, subnet addressing and others. Since the IP 58 is an unacknowledged protocol, datagrams may be discarded and the ICMP 56 is used for error reporting. For more information on the ICMP 56 see RFC-792 incorporated herein by reference.

Above the IP 58 and the ICMP 56 is a transport layer with a User Datagram Protocol layer 60 ("UDP"). The UDP layer 60, hereinafter UDP 60, roughly corresponds to OSI layer 4, the transport layer, but is typically not defined as part of the OSI model. As is known in the art, the UDP 60 provides a connectionless mode of communications with datagrams. For more information on the UDP 60 see RFC-768 incorporated herein by reference.

Above the network layer are a Simple Network Management Protocol ("SNMP") layer 62, a Trivial File Protocol ("TFTP") layer 64, a Dynamic Host Configuration Protocol ("DHCP") layer 66 and a UDP manager 68. The SNMP layer 62 is used to support network management functions. For more information on the SNMP layer 62 see RFC-1157 incorporated herein by reference. The TFTP layer 64 is a file transfer protocol used to download files and configuration information. For more information on the TFTP layer 64 see RFC-1350 incorporated herein by reference. The DHCP layer 66 is a protocol for passing configuration information to hosts on an IP 54 network. For more information on the DHCP layer 66 see RFC-1541 incorporated herein by reference. The UDP manager 68 distinguishes and routes packets to an appropriate service (e.g., a virtual tunnel). More or few protocol layers could also be used with a data-over-cable system 16.

An operating environment for the CM 28 and other network devices of the present invention includes a processing system with at least one high speed Central Processing Unit ("CPU") and a memory system. In accordance with the practices of persons skilled in the art of computer programming, the present invention is described below with reference to acts and symbolic representations of operations that are performed by the processing system, unless indicated otherwise. Such acts and operations are sometimes referred to as being "computer-executed", or "CPU executed."

It will be appreciated that the acts and symbolically represented operations include the manipulation of electrical signals by the CPU. The electrical signals represent data bits which cause a resulting transformation or reduction of the electrical signal representation, and the maintenance of data bits at memory locations in the memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic disks, and any other volatile or non-volatile mass storage system readable by the CPU. The computer readable medium includes cooperating or interconnected computer readable media, which exist exclusively on the processing system or is distributed among multiple interconnected processing systems that may be local or remote to the processing system.

Upstream Data Transmission

The upstream channel may be viewed as time-divided into a stream of mini-slots. A mini-slot is used as a unit of granularity for upstream transmission opportunities. A CM 28 is permitted to transmit on an upstream channel during a transmission mini-slot allocated by the CMTS 30. When a CM 28 wishes to transmit data it must first request permission from the CMTS 30. The CMTS 30 receives requests from a selection of cable modems that wish to transmit and may allocate one or more transmission mini-slots to each of the cable modems. The cable modems alternately transmit during the mini-slots. Mini-slots are timed to prevent collisions between the transmissions from different cable modems.

Figure 3:
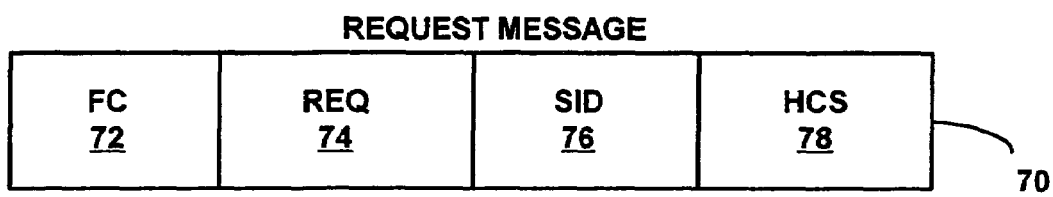
FIG. 3 is a block diagram illustrating the structure of a Request message.

A CM 28 that wishes to transmit sends a Request MAC 54 message to the CMTS 30. FIG. 3 is a block diagram illustrating a structure of a Request message. The Request message 70 includes a frame control field 72 ("FC"), a bandwidth request field 74 ("REQ"), a service identifier field 76 ("SID"), and a MAC 54 header check sequence field 78 ("HCS"). Descriptions for the Request message 70 fields are shown in Table 1.

TABLE 1

| Request message 70 Parameter | Description |
| --- | --- |
| FC 72 | Frame control. Identifies type of MAC 54 message. |
| REQ 74 | Total amount of bandwidth requested in mini-slots. |
| SID 76 | Service Identifier for the CM 28 that sent the REQ message. |
| HCS 78 | MAC 54 header check sequence. |

The SID 76 is a unique identifier for the CM 28 that is requesting permission to transmit. The SID 76 may be assigned by the CMTS 30 when the CM 28 initializes and registers with the CMTS 30. The REQ 74 field contains a measure of how much bandwidth, i.e. mini-slots, the CM 28 requests for the transmission of its data to the CMTS 30.

Figure 4:
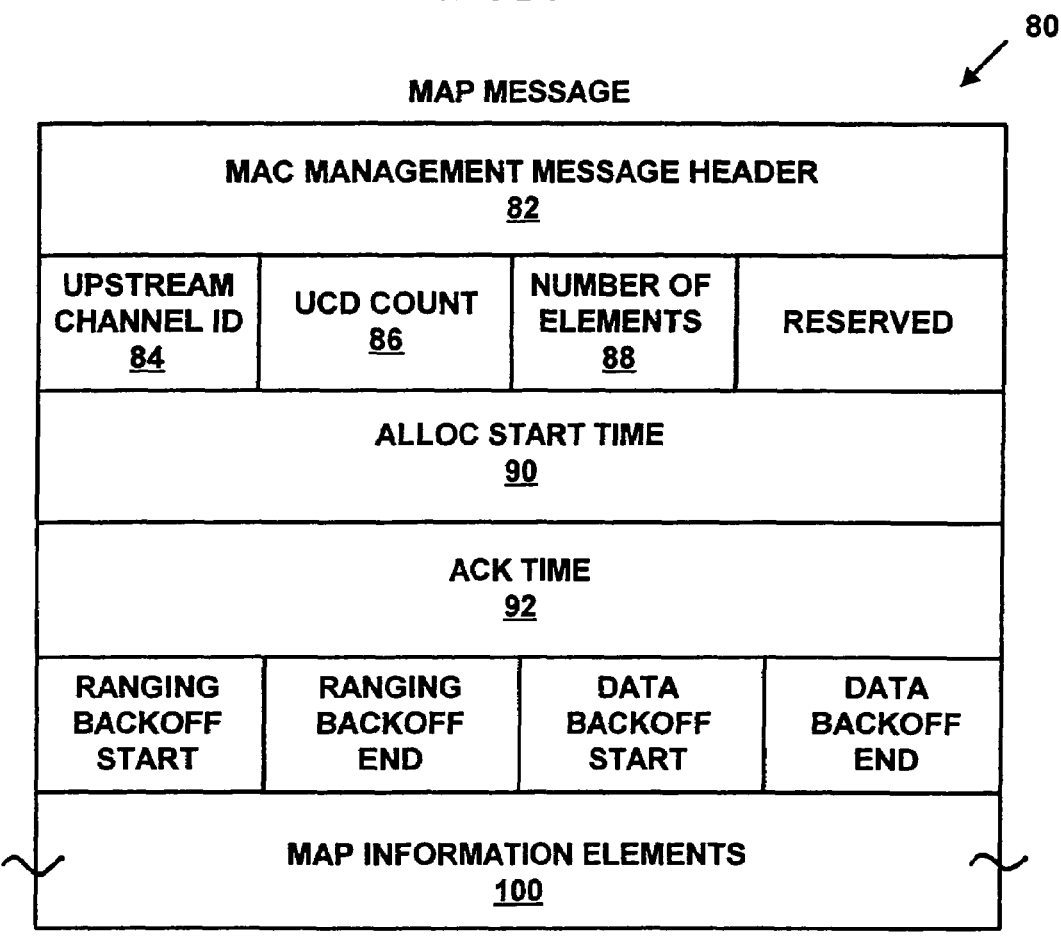
FIG. 4 is a block diagram illustrating the structure of a MAP message.

In response, the CMTS 30 builds an Upstream Bandwidth Allocation Map message ("MAP") and transmits it via the downstream channel to all cable modems. FIG. 4 is a block diagram illustrating the structure of a MAP message. The MAP message 80 includes a MAC 54 management header field 82, an upstream channel identifier field 84, a upstream channel descriptor count field 86 ("UCD Count"), a number of elements field 88, a reserved field, an allocation start time field 90 ("Alloc Start Time"), an acknowledgement time field 92 ("Ack Time"), a ranging backoff start field 94, a ranging backoff end field 96, a data backoff start field 98, a data backoff end field 100, and a MAP information elements field 102. Descriptions for the MAP message 80 fields are shown in Table 2.

TABLE 2

| MAP message 80 Parameter | Description |
| --- | --- |
| MAC 54 Management Message Header 84 | The header of this message identifying it as a MAP message. |
| Upstream Channel ID 84 | The identifier of the upstream channel to which this message belongs. |
| UCD Count 86 | Matched the value of the Configuration Change Count of the UCD which describes the burst parameters which apply to this map. |
| Number of Elements 88 | Number of information elements in the map. |
| Alloc Start Time 90 | Effective start time from CMTS 30 initialization (in mini-slots) for assignments within this map. |
| Ack Time 92 | Latest time, from CMTS initialization, (mini-slots) processed in upstream. |
| Ranging Backoff Start | Initial back-off window for initial ranging contention. |
| Ranging Backoff End | Final back-off window for initial ranging contention. |
| Data Backoff Start | Initial back-off window for contention data and requests. |
| Data Backoff End | Final back-off window for contention data and requests. |
| MAP Information Elements 100 | Encoded data blocks that designate the allocation of transmission mini-slots on the upstream channel. |

The MAP message 80 informs the cable modems of the allocation of mini-slots for a scheduled upstream usage interval and when to begin the usage interval. In a given upstream usage interval, selections of the CMs 28 alternately transmit on the upstream channel. As is known in the art, each upstream usage interval is composed of transmission intervals, also referred to as "bursts", which comprise at least one mini-slot.

An identifier for the upstream channel to which the MAP message 80 applies is placed in the Upstream Channel ID field 84. The MAP Information Elements field 100 designates the order and duration of the transmissions from the CMs. Each transmission may be described by one element. The number of elements in the MAP Information Elements field 100 is placed in the Number of Elements field 88.

Figure 5:
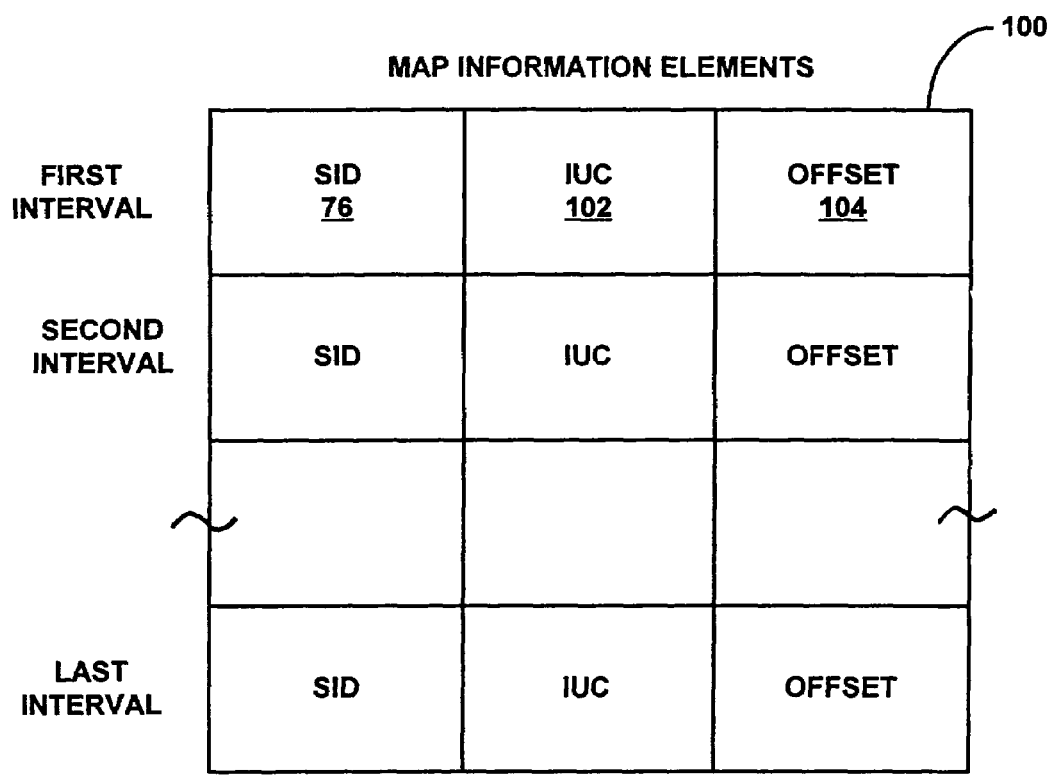
FIG. 5 is a block diagram illustrating the structure of MAP Information Elements.

FIG. 5 is a block diagram illustrating the structure of MAP Information Elements. The MAP Information Elements 100 designate intervals for transmissions by the CMs within the usage interval. Each interval includes a field for the SID 76 of the CM 28 that is permitted to transmit in each interval. The Interval Usage Code field 102 ("IUC") informs the CM 28 what kind of transmission is permitted in the interval. The offset field 104 specifies when the transmission interval occurs. In this manner, the series of intervals permit the selection of cable modems to deliver their data packets to the CMTS 30 without the transmissions colliding on the upstream path.

The IUCs 102 are values that designate the type of transmission that is permitted in each interval. The CMs may be capable of several types of transmission. For example, the transmission may be for the purposes of ranging, allowing the CM 28 to compensate for delay on the cable network. Additionally, the transmission may be for the purpose of delivering a data packet to the CMTS 30. Two types of data transmissions are typically permitted: a short data grant or a long data grant. These data grants have corresponding IUCs 102 as described in DOCSIS. For example, a short data grant may be appropriate when the CPE 14 only has a small amount of data to transmit on the upstream channel, such as a few keystrokes or the opening of a hyperlink on a web page. A long data grant may be appropriate when the CPE 14 requests to transfer a file through the backbone network 12. However, other field settings for the Request message 70, the MAP message 80, and the MAP Information Elements 100 are possible and it should be understood that other field structures and values could be used for the present invention.

Parameters for Data Transmission

Additionally, data packets that are transmitted in adjacent mini-slots may be transmitted according to different transmission formats for the RF interface 52. The formats are associated with parameters for data transmission. In one exemplary preferred embodiment of the present invention, the parameters for upstream data transmission include the symbol rate, the upstream channel frequency, the modulation type, the preamble, and Forward Error Correction ("FEC") parameters as described in Table 3.

TABLE 3

| Parameter for data transmission | Description |
| --- | --- |
| Frequency | Center frequency of upstream channel (Hz). |
| Symbol rate | Multiples of base rate of 160 ksym/sec. |
| Modulation type | QPSK or 16-QAM. |
| Preamble | Training sequence of bits used for automatic gain control and modulation. |
| FEC level (T) | Amount of redundant bytes that are added to correct for errors. |
| FEC data coverage size (k) | Amount of bytes over which error correction is to be performed. |

As is known in the art, FEC adds redundant bits to the data packet to detect, locate, and correct transmission errors. The FEC level ("T") is a measure of the amount of redundant data that must be added to the data packet to allow for error correction. A higher value of T provides a better level of error correction. The FEC data coverage size ("k") is a measure of the amount of information over which data correction is to be performed. For the same FEC level, an increase in the FEC data coverage size will result in more errors going uncorrected. It should be understood that many more data transmission parameters are possible and that the present invention is not restricted to the parameters described herein.

Figure 6:
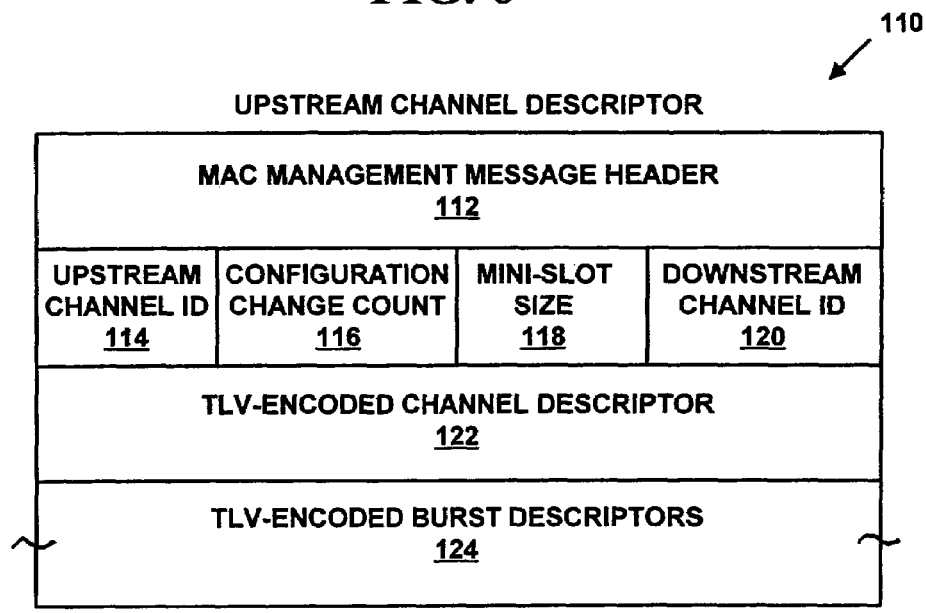
FIG. 6 is a block diagram illustrating the structure of a UCD message.

Each CM 28 transmitting in an upstream usage interval may transmit according to a different transmission format. Additionally, between upstream usage intervals, the CMs may each undergo reconfiguration so that their future transmissions occur according to another format. The CMTS 30 may reconfigure the CMs by issuing an Upstream Channel Descriptor ("UCD") message. FIG. 6 is a block diagram illustrating the structure of a UCD message. The UCD message 110 includes a MAC 54 Management Message Header field 112, an upstream channel identifier field 114, a configuration change count field 116, a mini-slot size field 118, a downstream channel identifier field 120, a type-length-value ("TLV") encoded channel information field 122, and TLV encoded burst descriptor field 124. Descriptions for the UCD message 110 fields are shown in Table 4.

TABLE 4

| UCD message 110 Parameter | Description |
| --- | --- |
| MAC 54 Management Message Header 112 | The header of this message identifying it as a UCD message. |
| Upstream Channel ID 114 | The identifier of the upstream channel to which this message belongs. |
| Configuration Change Count 116 | CMTS increments by one whenever any descriptors change. |
| Mini-Slot Size 118 | The duration of a mini-slot. |
| Downstream Channel ID 120 | The identifier of the downstream channel on which this message has been transmitted. |
| TLV Encoded Channel Descriptors 122 | Data blocks which describe the parameters for data transmission to be implemented for the overall channel. |
| TLV Encoded Burst Descriptors 124 | Data blocks which describe the parameters for data transmission to be implemented for each burst. |

TLV encoding is known to those skilled in the art. A selection of parameters for the overall channel and the bursts are given in Table 3. These parameters may be encoded as channel or burst descriptors and incorporated into a UCD message 110 to reconfigure cable modems. However, it should be understood that other field structures and values for the UCD message 1110 could be used for the present invention.

When the CMTS 30 changes the data transmission parameters for an upstream channel, it builds a UCD message 110 with channel and/or burst descriptors that correspond to the new parameters. The UCD message 1110 is sent on the downstream channel 26 to the CMs 28. The CMTS 30 also sends out a corresponding MAP message 80. The burst descriptors in the UCD message 1110 correspond to the IUC fields 102 of the MAP Information Elements 100 of the MAP message 80. As each CM 28 transmits on the upstream it may be doing so according to data transmission parameters that are different from other CMs. In this manner, the CMs within an upstream usage interval may alternately transmit data packets to the CMTS 30 according to independent data transmission parameters.

Errors in Data Packets

Data packets, however, may become corrupted during transmission on the upstream channels. The source of the corruption may be noise on the upstream channel or a flaw in the optical or electrical components in the cable television network. When an error in a data packet is detected, the data packet may be discarded or it may be resent by the CM 28. A measure of the throughput of the upstream channel is the "payload data rate". Payload data rate is a rate at which actual data is sent over an upstream channel. The payload data rate of the cable network will decrease if data packets are corrupted. Even if data packets are resent, the retransmission corresponds to less payload successfully getting through the upstream channel in any give time and the payload data rate correspondingly decreases. The payload data rate depends on the size of the data packet size, or payload size, as shorter payloads may have a better chance of getting through the upstream channel without corruption. Put another way, if a large payload is corrupted then the whole data packet must be discarded or resent whereas splitting the payload into shorter data packets may increase the chance that some portion of the payload gets through the upstream channel. Additionally, the payload data rate is dependent on the FEC parameters T and k, the symbol rate, the size of the preamble, and the modulation type.

Packet-error-ratio ("PER") is a measure of is the ratio of errored data packets to the total number of data packets transmitted. PER is a more uniform measure of system performance as it may ensure consistent performance no matter what the size of the data packet. Additionally, the PER is independent of whether corrupted data packets are discarded or resent. Some forms of data transmission, such as streaming video or audio, or Internet telephony, may continue to retain integrity if data packets are discarded. Other forms of data transmission, such as data file transfer, may retain integrity if data packets are resent.

Data transmission on an upstream channel may remain consistent if the data-over-cable system maintains a target PER. In one exemplary preferred embodiment, the target PER is a default value. For example, the default value may be selected by the vendor of the data-over-cable system. In another exemplary preferred embodiment of the present invention the target PER is selected by a user. For example, the user may be a technician at the cable plant or a cable system operator. The user may be able to observe the characteristics of data transmission on their configuration of a data-over-cable system and select an appropriate target PER. Alternately, the user may select an appropriate PER based on the type and extent of the services that they provide.

Optimizing Data Throughput at a Target PER

Payload data rate or throughput is affected by PER if it is desired that a target PER be maintained. Lowering the target PER may lower the maximum payload data rate that can be achieved. For example, given a signal-to-noise ratio on the upstream channel, a lower PER may require a lower symbol rate or may require more overhead to correct for errors. However, at a desired target PER there may be a selection of values for the parameters for data transmission that results in an optimal data throughput.

FIG. 7 is a flow diagram illustrating a Method 130 for optimizing data throughput on an upstream channel at a target packet error ratio. The Method 130 includes ascertaining a signal-to-noise ratio on the upstream channel at Step 132. At Step 134, parameters for data transmissions by the cable modems on the upstream channel are determined. The determined parameters are associated with the signal-to-noise ratio and the target packet error ratio. At Step 136 the use of the determined parameters in the upstream channel are negotiated.

In one exemplary preferred embodiment the parameters for data transmission are selected from a group consisting of symbol rate, modulation type, or error correction levels. Having ascertained the signal-to-noise ("SNR") on the upstream channel, certain parameters for data transmission may be associated with optimal data throughput given the target PER and the ascertained SNR. Examples of the parameters are provided in Table 3. In another exemplary preferred embodiment the modulation type may be a QAM type such as QPSK or 16-QAM, the error correction level may be a FEC level (T) or a FEC data coverage size (k), and the symbol rate may be a multiple of 160 ksym/sec. Another selection of the parameters may result in a less-than-optimal data throughput for data transmission given the noise condition and desired performance on the upstream channel.

In another exemplary preferred embodiment, the data throughput is optimized for a preconfigured payload size. In this embodiment, the parameters may be determined on the basis of a smallest, largest, or average payload size for data transmission. The payload size that forms the basis may be preconfigured by the user. However, there may be less-than-optimal data throughput for data packets whose payload size is other than the preconfigured payload size.

In yet another exemplary preferred embodiment, the parameters are associated with a payload size for data packets. Larger payloads may require different parameters than smaller payloads in order to have optimal data throughput. For a given target PER, substantially the same number of data packets are corrupted. Discarding data packets with larger payload results in less throughput than if the same amount of payload were distributed among a greater number of data packets with smaller payloads. In another exemplary preferred embodiment, the payload size of a data transmission is ascertained. For example, the payload size may be ascertained from a Request message 70. The REQ field 74 may provide sufficient information to ascertain the amount of data that a CM 28 wishes to transmit to the CMTS 30. Alternately, the SID field 76 may identify a CM 28 that typically transmits data packets with a particular payload size. Furthermore, an IUC field 102 may indicate whether a CM 28 is permitted a short data grant or a long data grant for data transmission and a payload size may be ascertained for that data grant. It should be understood, however, that the present invention is not limited to these embodiments and other data transmission parameters, associations, and methods of ascertaining payload sizes for the data-over-cable system may be used.

In yet another exemplary preferred embodiment, the Step 136 of negotiating the use of the determined parameters in the upstream channel comprises building a UCD message 110 based on the determined parameters and sending the UCD message 110 to the CMs 28. For example, given a target PER and ascertained SNR, the parameters for optimal data throughput may be determined and encoded in channel descriptor 122 and/or burst descriptor 124 fields of a UCD message 110. The UCD message 110 may then be sent on a downstream channel to the CMs 28. In yet another exemplary preferred embodiment, the method further comprises the step of reconfiguring the CMs 28 to transmit data according to the determined parameters. For example, the UCD message 110 may be received by a CM 28. The CM 28 examines the UCD message 110, decodes the information in the channel descriptor field 122, and ascertains the parameters for data transmission on the upstream channel, e.g. symbol rate, preamble, and/or frequency. The CM 28 also decodes the information in the burst descriptor field 124 and ascertains the parameters for each burst as allocated by a MAP message 80 that corresponds to the UCD message 110, e.g. modulation type and/or FEC parameters. However, it should be understood that the present invention is not limited to these embodiments and other methods for negotiating and configuring may be used.

Exemplary Ascertaining of the SNR

In one exemplary preferred embodiment of the present invention, the Step 132 of ascertaining a SNR on the upstream channel is performed on the CMTS 30. For example, the CMTS 30 may have the capability of measuring the noise floor on the upstream channel and converting it to a value for the SNR. Alternately, the CMTS 30 may directly measure the SNR for data transmissions by methods known to those skilled in the art. However, the present invention is not restricted to ascertaining the SNR on the CMTS 30 and the SNR may be ascertained at other points and on other devices in the cable system.

In another exemplary preferred embodiment, the Step 132 of ascertaining a SNR on the upstream channel comprises scheduling multiple quiescent periods on the upstream channel, measuring a noise floor value on the upstream channel during one of the quiescent periods, and converting the measured noise floor value to the SNR. Quiescent periods are where no data is transmitted by the cable modems on the upstream channel. For example, the cable system may be capable of providing a measurement of the noise floor on the upstream channel. The noise floor value is a measure of RF power within the bandwidth for the upstream channel when no data is being transmitted. The CMTS 30 may be designed to operate at a constant upstream carrier power level. The value of the noise floor in combination with the value of the designed carrier power level may be converted to a SNR.

In another exemplary preferred embodiment, the SNR for the upstream bandwidth may be converted to a value for a nominal bandwidth by methods known to those skilled in the art. For example, the bandwidth of the upstream channel may depend on the configuration of the cable system. Some configurations may provide a single upstream channel with a larger bandwidth whereas other configurations may provide multiple upstream channels with smaller bandwidths. Converting the SNRs for each bandwidth to a SNR for a nominal bandwidth may provide for a determination of the parameters for optimal throughput that is not dependent on the configuration of the data-over-cable system.

In yet another exemplary preferred embodiment, the Step 132 of ascertaining a SNR on the upstream channel comprises scheduling a plurality of quiescent periods on the upstream channel, measuring noise floor values on the upstream channel during the quiescent periods, averaging the measured noise floor values to obtain an average noise floor value, and converting the average noise floor value to the SNR. A single noise floor measurement may be insufficient to ascertain a SNR for an upstream channel. As an illustrative example, a data-over-cable system with a plurality of upstream channels may encounter "cross-talk" between upstream channels. A quiescent period for a first upstream channel may coincide with an active period or a quiescent period on a second upstream channel. A measurement of the noise floor on the first upstream channel would vary depending on whether the second upstream channel were active or not. Averaging the noise floor values over a plurality of quiescent periods may provide a more reliable ascertaining of the SNR than would a single noise floor measurement. The ascertained SNR may yield parameters for data transmission that optimize data throughput under less-than-ideal conditions. However, it should be understood that the present invention is not limited to these embodiments of ascertaining SNR values and other methods may be used.

Exemplary Determination of Parameters for Data Transmission

The parameters for data transmission by the CMs 28 optimize the data throughput of the data-over-cable system for a given target PER and ascertained SNR. In one exemplary preferred embodiment, the parameters may be read from a table. Entries in the table comprise values for the parameters, target PER, and SNR. When a SNR is ascertained, the entry in the table with the SNR and target PER is found and the parameters in the entry are read. The use of the parameters in the entry are negotiated in the upstream channel to provide optimal data throughput. In another exemplary preferred embodiment, the parameters are also associated with an ascertained payload size and similarly read from a table. Entries in this table include values for the parameters, target PER, SNR, and payload size. Alternately, there may be multiple tables, one for each payload size, each of whose entries include parameters, target PER, and SNR. However, it should be understood that determining parameters in the present invention is not limited to reading parameters from tables and other methods and structure for tables may be used.

Figure 8A:
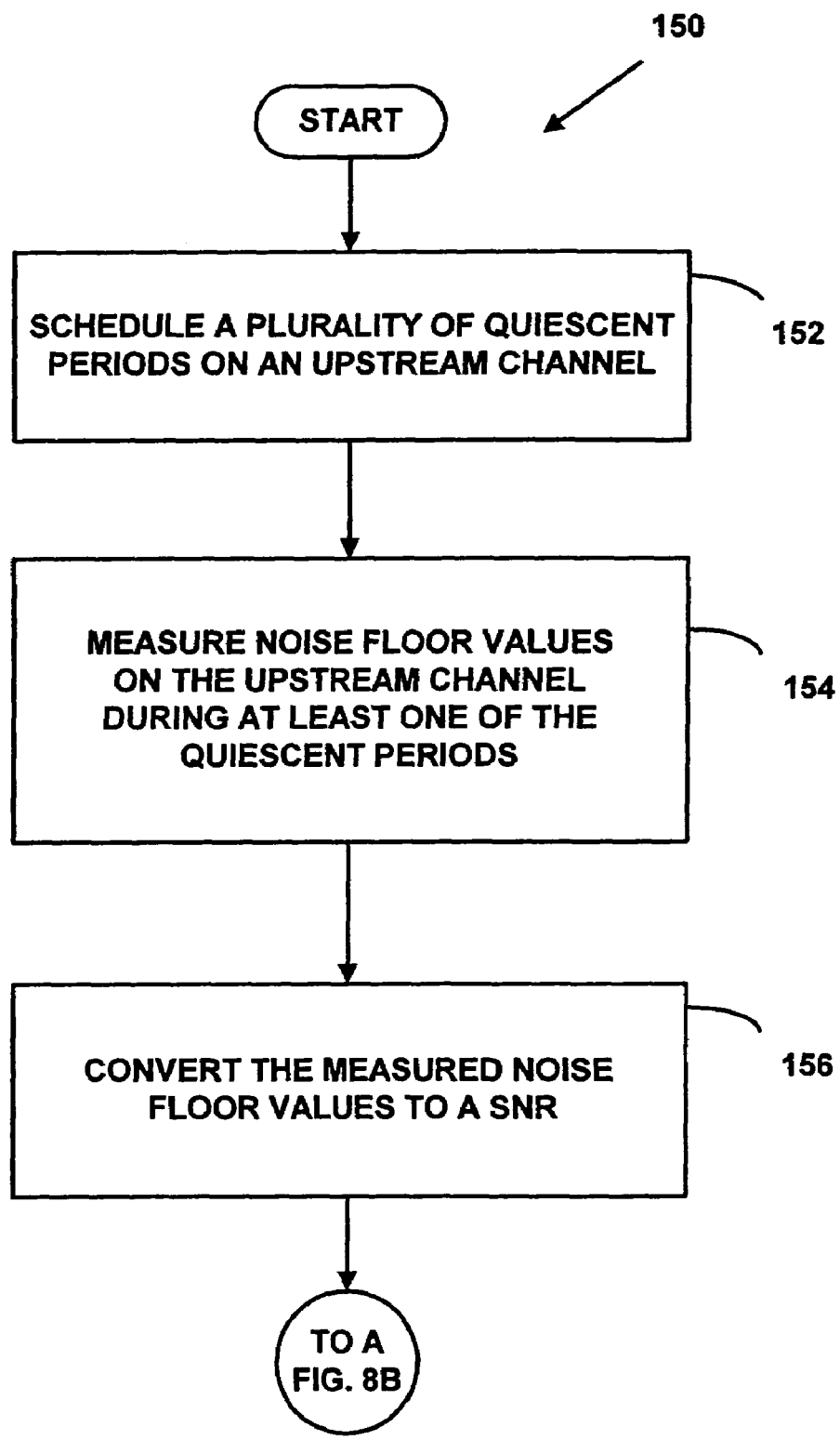
FIG. 8 is a flow diagram illustrating a method for optimizing data throughput on an upstream channel.
Figure 8B:
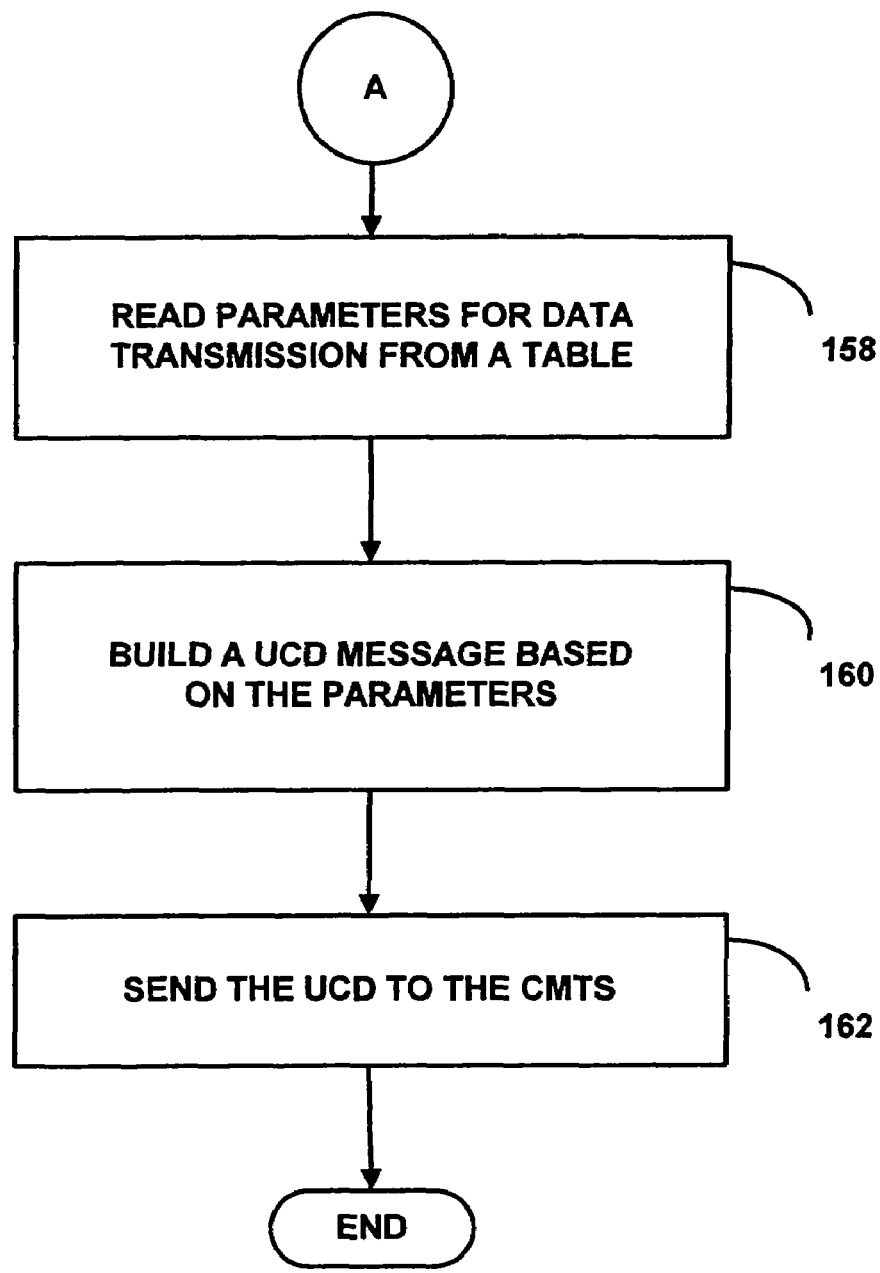

FIG. 8 is a flow diagram illustrating a Method 150 for optimizing data throughput on an upstream channel at a target PER. The Method 150 includes scheduling a plurality of quiescent periods on the upstream channel at Step 152. At Step 154 a noise floor value is measured on the upstream channel during at least one of the quiescent periods. The measured noise floor values is converted to a SNR at Step 156. At Step 158, parameters for data transmission on the upstream channel are read from a table. The parameters in the table are associated with the SNR and the target PER. A UCD message 110, based on the parameters, is built at Step 160 and sent to the CMs 28 at Step 162. Method 150 allows for the data-over-cable system to optimize its performance dynamically. In operation, the data-over-cable system may dynamically adjust the parameters of its RF interface for the highest data throughput.

Figure 9:
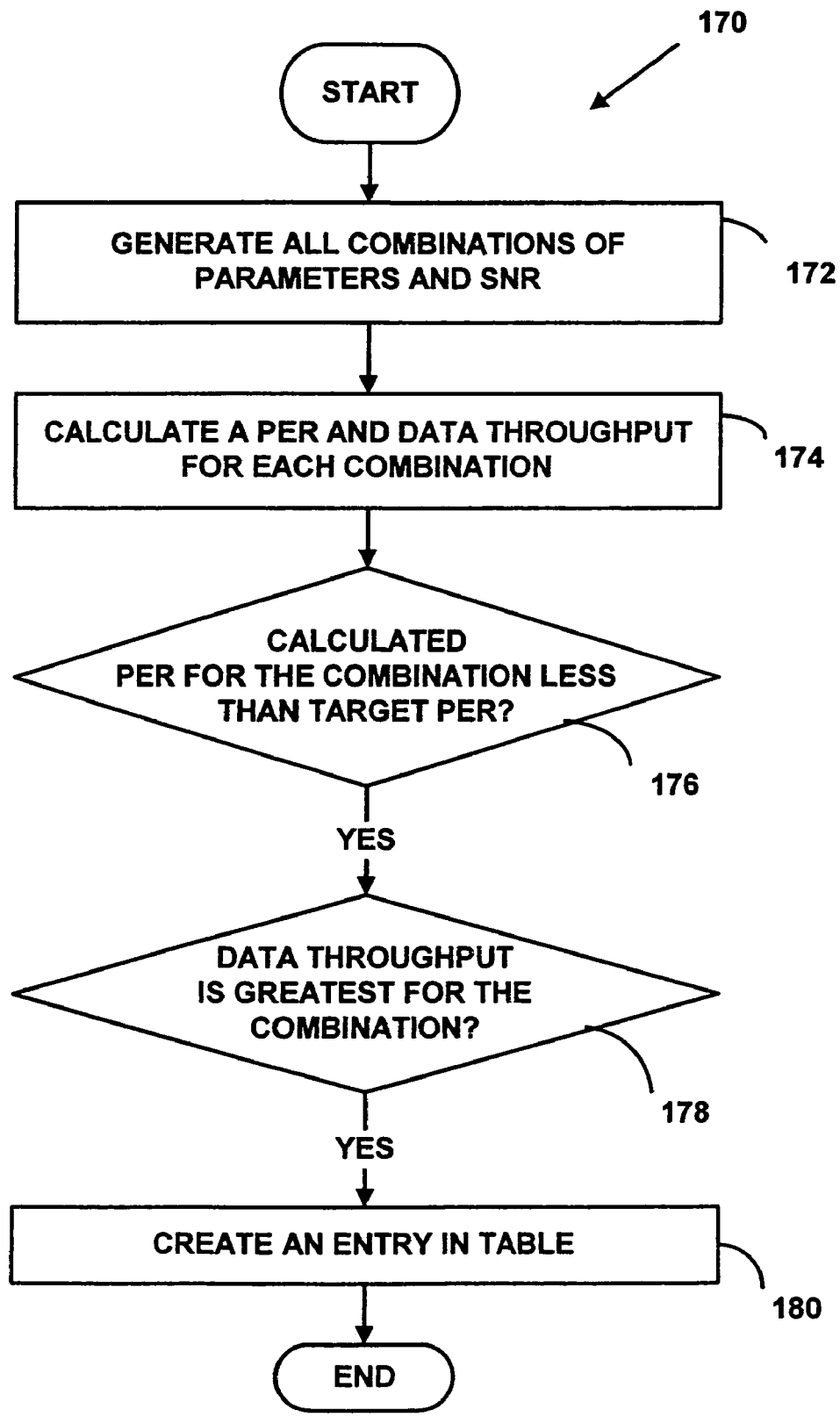
FIG. 9 is a flow diagram illustrating a method for predetermining table entries.

In yet another exemplary preferred embodiment, table entries are predetermined. For example, examination of the characteristics of a data-over-cable system may suggest which parameters optimize data throughput under a variety of operating conditions. In yet another exemplary preferred embodiment, table entries may be predetermined by the method shown in FIG. 9. FIG. 9 is a flow diagram illustrating a Method 170 for predetermining the table entries for a given payload size. The Method 170 includes generating all combinations of parameters and SNRs at Step 172. At Step 174 a PER and data throughput are calculated for each combination. At Step 176 it is determined whether the calculated PER for the combination is less than the target PER, and if so, it is determined whether the data throughput for the combination is the greatest at Step 178. If the data throughput is greatest, the entry in the table is created at Step 180. The entry includes the value of the generated SNR for the combination, the target PER, and the generated parameters for the combination. In this manner, entries for the table are created which represent the parameters for data transmission that optimize data throughput under different conditions for RF transmission on an upstream channel for a desired system performance. Generating all combinations of parameters and SNR may provide a simulation of conditions for RF transmission on an upstream channel. Each combination may correspond to a different condition for RF transmission. For each condition a PER and a data throughput, or payload data rate, are calculated and may represent a PER and data throughput that would be attained in an operating data-over-cable system. The combinations are examined to find those that yield the greatest data throughput while maintaining the target PER.

In yet another exemplary preferred embodiment, the Step 174 of calculating the PER for a combination includes calculating a bit error ratio for the combination, converting the bit error ratio to a byte error ratio, converting the byte error ratio to a codeword error ratio, and converting the codeword error ratio to the PER. For example, by methods well known to those skilled in the art of signal processing, a value of SNR may be translated to a bit-error-ratio ("BER") for a given symbol rate. From the BER may be derived a value for the ratio of how many times a byte of data will be in error. A codeword may incorporate FEC bytes in addition to a number of bytes of raw data and a codeword-error-ratio is a measure of how many codewords will be in error compared to a total number of codewords. The codeword-error-ratio may depend on the FEC parameters T and/or k, how much payload is included in the codeword, and the byte-error-ratio. The codeword-error-ratio may be converted to a PER.

Figure 10B:
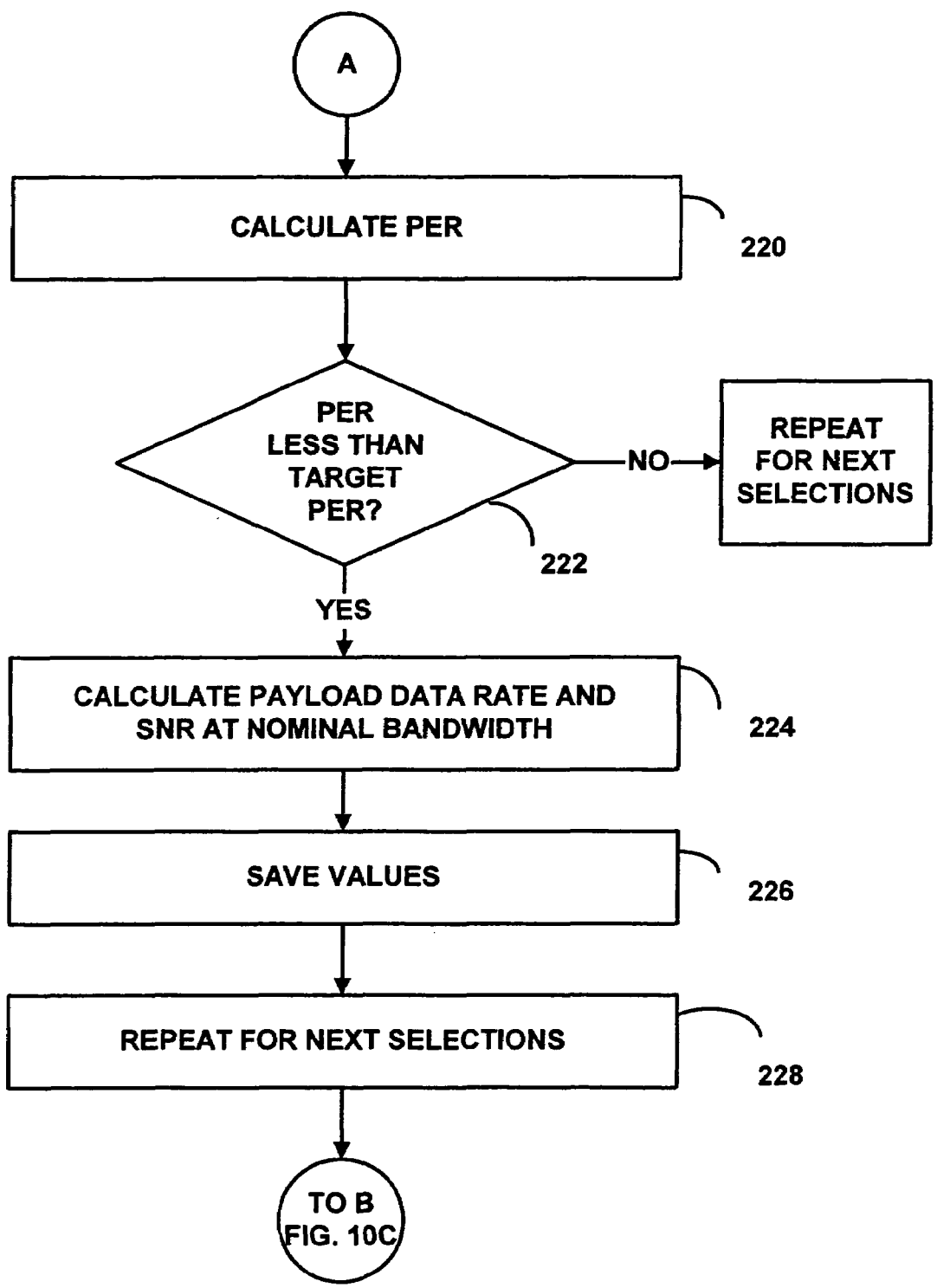
FIG. 10 is a flow diagram illustrating a method for predetermining table entries.
Figure 10C:
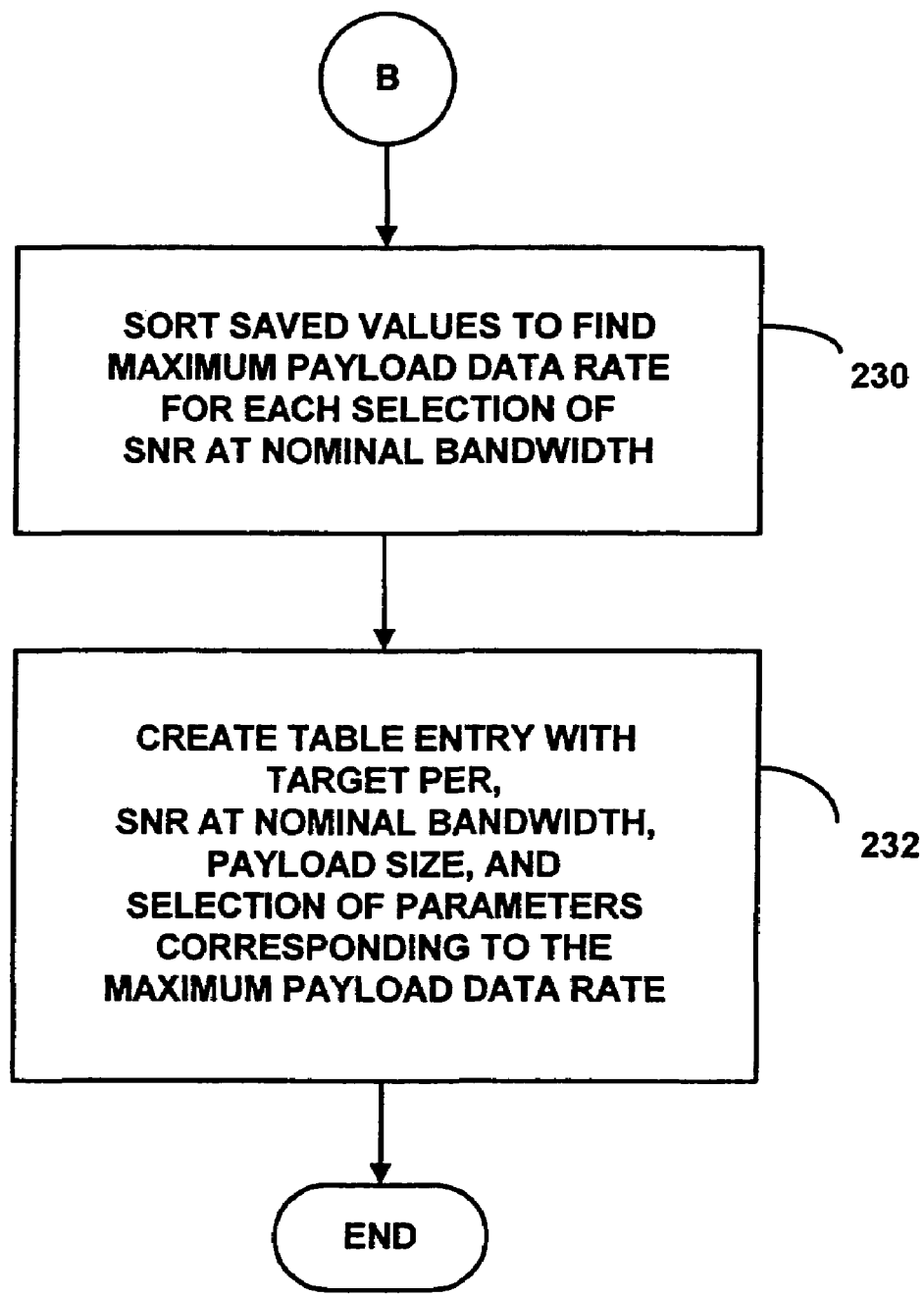

FIG. 10 is a flow diagram illustrating a Method 190 for predetermining table entries for a given payload size. Method 190 includes the following steps. At Step 192 a target PER and payload size are input. Selections are then made for the parameters for data transmission. A modulation type is selected to be QPSK or 16-QAM at Step 194. A symbol rate of 160, 320, 640, 1280, or 2560 ksym/sec is selected at Step 196. At Step 198, a FEC level from zero to ten is selected. A SNR is selected at Step 200. Illustrative selections for the SNR are from 40 to 12 for 16-QAM modulation type or 6 for QPSK modulation although other selections are possible and the present method is not limited to these ranges. At Step 210, the FEC data coverage size is selected from 16 to 253 bytes.

A value of PER for these parameter and SNR selections is calculated at Step 220. Selections whose calculated PER does not meet the target PER are discarded at Step 222 and Steps 194 to 222 are repeated for another selection of parameters and SNR. At Step 224, selections that do meet the target PER are used as a basis for calculating a payload data rate for the selection. Additionally, the SNR may be converted to a value of SNR at a nominal bandwidth as described above. An illustrative nominal bandwidth may be 4 MHz although other nominal bandwidths are possible and the present method is not limited to a 4 MHz bandwidth. The values for the parameters and SNR at nominal bandwidth are saved at Step 226 and Steps 194 to 222 are repeated for another selection of parameters and SNR.

The saved values are sorted at Step 230 to find a maximum payload data rate for each selection of SNR at the nominal bandwidth. The selection of parameters that correspond to this maximum payload rate optimize the data throughput for the input target PER. At Step 232 a table entry is created. The table entry includes the input target PER, the input payload size, the parameters, and SNR at nominal bandwidth that correspond to the maximum payload data rate. Tables 5 and 6 illustrate the maximum payload data rate that may be achieved for the above method.

TABLE 5

| 100 Byte Payload | Maximum Payload Data Rate (MB/s) | | | |
|---|---|---|---|---|
| SNR (dB) | 1 E-1 (PER) | 1 E-4 (PER) | 1 E-6 (PER) | 1 E-8 (PER) |
| −5 | 0.223 | 0.213 | 0.188 | 0.152 |
| 0 | 0.828 | 0.634 | 0.457 | 0.451 |
| 5 | 2.592 | 1.802 | 1.777 | 1.730 |
| 10 | 3.876 | 3.821 | 3.765 | 3.710 |
| 15 | 7.508 | 7.314 | 7.111 | 7.013 |

For a payload size of 100 Bytes and target PERs ranging from 1E-1 to 1E-8, Table 5 presents the maximum payload data rates that may be achieved under a selection of nominal SNR values for data transmission in the upstream channel. Associated with each entry in Table 5 are data transmission parameters (not shown) that accomplish the maximum throughput. Similarly, Table 6 presents the maximum payload data rates for a payload size of 1550 Bytes.

TABLE 6

| 1550 Byte Payload | Maximum Payload Data Rate (MB/s) | | | |
|---|---|---|---|---|
| SNR (dB) | 1 E-1 (PER) | 1 E-4 (PER) | 1 E-6 (PER) | 1 E-8 (PER) |
| −5 | 0.277 | 0.253 | 0.210 | 0.136 |
| 0 | 0.900 | 0.601 | 0.596 | 0.586 |
| 5 | 2.362 | 2.326 | 2.255 | 2.111 |
| 10 | 4.933 | 4.893 | 4.851 | 4.810 |
| 15 | 9.522 | 9.380 | 9.228 | 8.917 |

Many other methods for predetermining table entries are possible and it should be understood that the present invention is not limited to the above embodiments.

Exemplary Methods for Adapting to Variances

FIG. 11 is a flow diagram illustrating a Method 240 for optimizing data throughput on an upstream channel. The Method 240 includes the Method 130 of FIG. 7. A substantial variance in the SNR is recognized at Step 242. At Step 244 it is ascertained whether the variance in the SNR is consistent over a given number of transmission cycles. If the variance in the SNR is consistent, new parameters for data transmission on the upstream channel are determined at Step 246. The new parameters are associated with the variance in the SNR. At Step 248, the use of the new determined parameters in the upstream channel is negotiated.

The SNR of an upstream channel may not be constant in some data-over-cable systems but may vary with conditions for RF transmission. The Method 240 allows the data-over-cable system to adapt to substantial variances in the SNR. In one exemplary preferred embodiment, a variance in SNR of 5 dB may be considered substantial although it should be appreciated that many other values for a substantial variance in SNR are possible and the present invention is not limited to this value. In addition, a substantial variance that is consistent over a given number of transmission cycles may diminish the effect of an anomalous fluctuation in SNR. In another exemplary preferred embodiment the transmission cycle is an upstream usage interval. In this manner, a recognized change in the conditions for RF transmission on the upstream channel may result in the determination of new parameters for data transmission. These new parameters for data transmission may optimize data throughput for the new conditions.

FIG. 12 is a flow diagram illustrating a Method 250 for optimizing data throughput on an upstream channel. The Method 250 includes the Method 130 of FIG. 7. The Method 250 includes measuring a payload size for a selection of data transmissions on the upstream channel at Step 252. The upstream channel comprises a plurality of data transmissions. A substantial variance in the payload size is recognized at Step 254. At Step 256 it is ascertained whether the variance in the payload size is consistent over a given number of transmission cycles. If the variance in the payload size is consistent, new parameters for data transmission on the upstream channel are determined at Step 258. The new parameters are associated with the variance in the payload size. At Step 260 the use of the new determined parameters in the upstream channel are negotiated.

Payload sizes of the data packets may not be consistent in some data-over-cable systems but may vary with network use. For example, a single CPE 14 may be primarily engaged in web browsing and then have to transfer a large file upstream. The data transmissions from the CPE 14 during web browsing may require short data grants from the CMTS 30 whereas the file transfer may require long data grants. Parameters that optimized data throughput for web browsing may not optimize data throughput for file transfer. Recognizing a substantial variance in the payload size for a selection of data transmissions may allow the data-over-cable system to adapt to the new use of the network. In yet another exemplary preferred embodiment, the selection of data transmissions is associated with a single IUC 102. For example, the CMTS 30 may be allocating short data grants to a CM 28. The payload size is associated with the IUC 102 for a short data grant. The payload for data transmissions may initially be small, the payload may easily be delivered within the short data grant, and the data throughput is optimal at this payload size. When the network use changes, however, the CM 28 may try to deliver more payload in the short data grant. The data throughput at the higher payload size may be less than optimal. The Method 250 allows for a recognized change in the conditions for network use to result in the determination of new parameters for data transmission. These new parameters for data transmission may optimize data throughput for the new conditions.

FIG. 13 is a flow diagram illustrating a Method 270 for optimizing data throughput on an upstream channel. The Method 270 includes measuring a PER for a selection of data transmissions on the upstream channel at Step 272. At Step 274, a substantial variance in the measured PER for a selection of data transmissions is recognized. The substantial variance in PER is without a corresponding change in SNR or a payload size. At Step 276, it is ascertained whether the variance in the measured PER is consistent over a given number of transmission cycles. If the variance in the measured PER is consistent, a FEC level of the data transmission is adjusted to compensate for the variance at Step 278.

The PER of data packets may not be consistent in some data-over-cable systems but may vary with the level of error correction. If the payload size of the data transmissions does not change and the cable system has the same SNR, a change in PER only may indicate that the level of error correction is not appropriate. Recognizing a substantial variance in the PER for a selection of data transmissions may allow the data-over-cable system to adapt to a new level of error correction. In yet another exemplary preferred embodiment, the selection of data transmissions is associated with a single IUC 102. For example, short data grants, recognized by their IUC 102, may have a changed PER whereas long data grants are transmitted at the same PER. The Method 270 allows for a recognized change in the performance of the network to result in the determination of a new level of error correction. This new level of error correction may optimize data throughput for the new performance level of the network.

It should be understood that the programs, processes, methods, systems and apparatus described herein are not related or limited to any particular type of computer apparatus (hardware or software), unless indicated otherwise. Various types of general purpose or specialized computer apparatus may be used with or perform operations in accordance with the teachings described herein.

In view of the wide variety of embodiments to which the principles of the invention can be applied, it should be understood that the illustrated embodiments are exemplary only, and should not be taken as limiting the scope of the present invention. For example, the Steps of the flow diagrams may be taken in sequences other than those described, and more or fewer elements or component may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

I claim:

1. In a data-over-cable system, a method for optimizing data throughput on an upstream channel at a target packet error ratio, the upstream channel providing data transmissions from a plurality of cable modems to a cable modem termination system, the method comprising the steps of:
 ascertaining a signal-to-noise ratio on the upstream channel;
 determining parameters for data transmissions by the cable modems on the upstream channel, wherein the determined parameters are associated with the signal-to-noise ratio and the target packet error ratio;
 negotiating the use of the determined parameters in the upstream channel;
 recognizing a substantial variance in the signal to noise ratio;
 ascertaining whether the variance in the signal-to-noise ratio is consistent over a given number of transmission cycles, and if so,
 determining new parameters for data transmission on the upstream channel, wherein the new parameters are associated with the variance in the signal-to-noise ratio; and
 negotiating the use of the new parameters in the upstream channel.

2. A computer readable medium having stored therein instructions for causing a central processing unit to execute the method of claim 1.

3. The method of claim 1 wherein the target packet error ratio is selected by a user.

4. The method of claim 1 wherein the target packet error ratio is a default value.

5. The method of claim 1 wherein the ascertaining step is performed on the cable modem termination system.

6. The method of claim 1 wherein the ascertaining step comprises:
 scheduling a plurality of quiescent periods on the upstream channel wherein no data is transmitted by the cable modems on the upstream channel;
 measuring a noise floor value on the upstream channel during one of the quiescent periods; and
 converting the measured noise floor value to the signal-to-noise ratio.

7. The method of claim 1 wherein the ascertaining step comprises:
 scheduling a plurality of quiescent periods on the upstream channel wherein no data is transmitted by the cable modems on the upstream channel;
 measuring noise floor values on the upstream channel during the quiescent periods;
 averaging the measured noise floor values to obtain an average noise floor value; and
 converting the average noise floor value to the signal-to-noise ratio.

8. The method of claim 1 wherein the determined parameters are also associated with a payload size for a data transmission from one cable modem.

9. The method of claim 8 wherein the determined parameters are selected from a group consisting of symbol rate, modulation type, or error correction levels.

10. The method of claim 9 wherein the modulation type is a Quadrature Amplitude Modulation type.

11. The method of claim 9 wherein the error correction levels are selected from a group consisting of Forward Error Correction level or Forward Error Correction data coverage size.

12. The method of claim 1 wherein the negotiating step comprises:
building an Upstream Channel Descriptor message based on the determined parameters; and
sending the Upstream Channel Descriptor message to the cable modems.

13. The method of claim 1 further comprising:
reconfiguring the cable modems to transmit data according to the determined parameters.

14. In a data-over-cable system, a method for optimizing data throughput on an upstream channel at a target packet error ratio, the upstream channel providing data transmissions from a plurality of cable modems to a cable modem termination system, the method comprising the steps of:
ascertaining a signal-to-noise ratio on the upstream channel;
determining parameters for data transmissions by the cable modems on the upstream channel, wherein the determined parameters are associated with the signal-to-noise ratio and the target packet error ratio;
negotiating the use of the determined parameters in the upstream channel;
measuring a payload size for a selection of data transmissions on the upstream channel, wherein the upstream channel comprises a plurality of data transmissions;
recognizing a substantial variance in the payload size;
ascertaining whether the variance in the payload size is consistent over a given number of transmission cycles, and if so,
determining new parameters for data transmission on the upstream channel, wherein the new parameters are associated with the variance in the payload size; and
negotiating the use of the new determined parameters in the upstream channel.

15. The method of claim 14, wherein the selection of data transmissions is associated with a single Interval Usage Code.

16. The method of claim 14, wherein the target packet error ratio is a default value.

17. The method of claim 14, wherein the ascertaining step comprises:
scheduling a plurality of quiescent periods on the upstream channel wherein no data is transmitted by the cable modems on the upstream channel;
measuring a noise floor value on the upstream channel during one of the quiescent periods; and
converting the measured noise floor value to the signal-to-noise ratio.

18. The method of claim 14, wherein the determining step comprises:
ascertaining a payload size for a data transmission;
reading the parameters for the data transmission on the upstream channel from a table, wherein the determined parameters in the table are associated with the signal-to-noise ratio, the target packet error ratio, and the payload size.

19. The method of claim 14, wherein the determined parameters are also associated with a payload size for a data transmission from one cable modem.

20. The method of claim 19, wherein the determined parameters are selected from a group consisting of symbol rate, modulation type, or error correction levels.

21. The method of claim 14 further comprising:
reconfiguring the cable modems to transmit data according to the determined parameters.

22. In a data-over-cable system, a method for optimizing data throughput on an upstream channel at a target packet error ratio, the upstream channel providing data transmissions from a plurality of cable modems to a cable modem termination system, the method comprising the steps of:
ascertaining a signal-to-noise ratio on the upstream channel;
determining parameters for data transmissions by the cable modems on the upstream channel, wherein the determined parameters are associated with the signal-to-noise ratio and the target packet error ratio;
negotiating the use of the determined parameters in the upstream channel;
measuring a packet error ratio for a selection of data transmissions on the upstream channel;
recognizing a substantial variance in the measured packet error ratio without a corresponding change in the signal-to-noise ratio or a payload size for a selection of data transmissions;
ascertaining whether the variance in the measured packet error ratio is consistent over a given number of transmission cycles, and if so,
adjusting a Forward Error Correction level of the data transmission to compensate for the variance.

23. The method of claim 22, wherein the selection of data transmissions is associated with a single interval usage code.

24. The method of claim 22, wherein the target packet error ratio is a default value.

25. The method of claim 22, wherein the ascertaining step comprises:
scheduling a plurality of quiescent periods on the upstream channel wherein no data is transmitted by the cable modems on the upstream channel;
measuring a noise floor value on the upstream channel during one of the quiescent periods; and
converting the measured noise floor value to the signal-to-noise ratio.

26. The method of claim 22, wherein the determining step comprises:
ascertaining a payload size for a data transmission;
reading the parameters for the data transmission on the upstream channel from a table, wherein the determined parameters in the table are associated with the signal-to-noise ratio, the target packet error ratio, and the payload size.

27. The method of claim 22, wherein the determined parameters are also associated with a payload size for a data transmission from one cable modem.

28. The method of claim 27, wherein the determined parameters are selected from a group consisting of symbol rate, modulation type, or error correction levels.

29. The method of claim 22, further comprising:
reconfiguring the cable modems to transmit data according to the determined parameters.

30. In a data-over-cable system, a method for optimizing data throughput on an upstream channel at a target packet error ratio, the upstream channel providing data transmissions from a plurality of cable modems to a cable modem termination system, the method comprising the steps of:

ascertaining a signal-to-noise ratio on the upstream channel;

determining parameters for data transmissions by the cable modems on the upstream channel, wherein the determined parameters are associated with the signal-to-noise ratio and the target packet error ratio;

negotiating the use of the determined parameters in the upstream channel;

ascertaining a payload size for a data transmission;

reading the parameters for the data transmission on the upstream channel from a table, wherein the determined parameters in the table are associated with the signal-to-noise ratio, the target packet error ratio, and the payload size; and predetermining the table entries for a given payload size, wherein predetermining the table entries comprises (i) generating all combinations of parameters and signal-to-noise ratios, (ii) calculating a packet error ratio and data throughput for each combination, and (iii) determining whether the calculated packet error ratio for the combination is less than the target packet error ratio, and if so (iv) determining whether the data throughput for the combination is the greatest, and if so, (v) creating the entry in the table comprising the value of the generated signal-to-noise ratio for the combination, the target packet error ratio, and the generated parameters for the combination.

31. The method of claim 30, wherein the step of calculating the packet error ratio for the combination comprises the steps of:

calculating a bit error ratio for the combination;

converting the bit error ratio to a byte error ratio for the combination;

converting the byte error ratio to a codeword error ratio for the combination; and converting the codeword error ratio to the packet error ratio for the combination.

* * * * *